United States Patent [19]

Sayyadi et al.

[11] Patent Number: 5,425,826
[45] Date of Patent: Jun. 20, 1995

[54] METHOD AND APPARATUS FOR FORMING A WELDED IDENTIFICATION SLEEVE

[75] Inventors: Babak Sayyadi, Bothell, Wash.; Dennis W. Fritz, Lake Oswego, Oreg.; Edwin E. Thompson, Tigard, Oreg.; Gregory E. Jansen, Hillsboro, Oreg.

[73] Assignee: The Boeing Company, Seattle, Wash.

[21] Appl. No.: 176,161

[22] Filed: Dec. 29, 1993

Related U.S. Application Data

[63] Continuation-in-part of Ser. No. 723,246, Jun. 28, 1991, Pat. No. 5,275,674.

[51] Int. Cl.$^6$ .............................................. B65C 3/00
[52] U.S. Cl. ................................... 156/73.1; 156/267; 156/580.1; 156/580.2; 53/582
[58] Field of Search ............... 156/392, 267, 468, 510, 156/522, 475, 492, 73.1, 73.5, 580, 583.1, 580.1, 580.2; 53/399, 582, 589, 592; 228/1.1, 110.1

[56] References Cited

U.S. PATENT DOCUMENTS

| | | | |
|---|---|---|---|
| 2,006,116 | 6/1935 | Schmiedel | 156/475 |
| 2,543,323 | 2/1951 | Marsh | 216/30 |
| 2,941,570 | 6/1960 | Plym | 156/475 |
| 3,093,943 | 6/1963 | Kazimir | 53/592 |
| 3,466,847 | 9/1969 | Farkas | 53/198 |
| 3,864,191 | 2/1975 | Tovarys | 156/468 |
| 4,050,372 | 9/1977 | Kobiella | 156/73.5 X |
| 4,265,687 | 5/1981 | Mercer et al. | 156/73.1 |
| 4,316,760 | 2/1982 | Satomi | 156/468 |
| 4,570,422 | 2/1986 | Watanabe et al. | 53/557 |
| 4,576,675 | 3/1986 | Brux | 156/468 |
| 4,664,736 | 5/1987 | Faasse, Jr. | 156/267 X |
| 4,665,679 | 5/1987 | Watanabe | 53/131 |
| 4,770,729 | 9/1988 | Spencer et al. | 156/267 X |
| 4,832,767 | 5/1989 | Eller | 156/53 |
| 5,121,682 | 6/1992 | Parker et al. | 53/589 X |

FOREIGN PATENT DOCUMENTS

WO88/01247 2/1988 WIPO .............................. B56C 3/02

Primary Examiner—James J. Engel
Attorney, Agent, or Firm—Christensen, O'Connor, Johnson & Kindness

[57] ABSTRACT

An automated applicator (120) for forming a welded identification sleeve (34) around an elongate object, such as a conductor (16), includes a base (124, 146, 148) defining a receiving surface (186) for receiving the conductor. A reversible line-feed printer (18) for feeding a weldable material strip (24) is positioned adjacent the receiving surface of the base. The printer is capable of selective operation in an advance mode to advance the leading end portion (22) of the material strip toward a first end of the base and transversely past the conductor, and a reverse mode in which the material strip is retracted away from the first end of the base. The applicator includes a guide member (151) mounted on the base and positionable adjacent the receiving surface for guiding the lead portion of the material strip, when advanced by the printer, around the elongate object. When so advanced, the leading end portion of the material strip overlaps the material strip in order to wrap the conductor. The applicator further includes a vacuum line (244) and grip assembly (246) mounted on the base for gripping the wrapped lead portion of the material strip during operation of the printer in the reverse mode to tighten the wrapped material strip around the conductor. An ultrasonic welder (33) mounted on the base welds the wrapped lead portion of the material strip to the material strip, thereby forming the tubular sleeve around the elongate object. A cutting blade (52) mounted on the base cuts the tubular sleeve from the material strip.

23 Claims, 12 Drawing Sheets

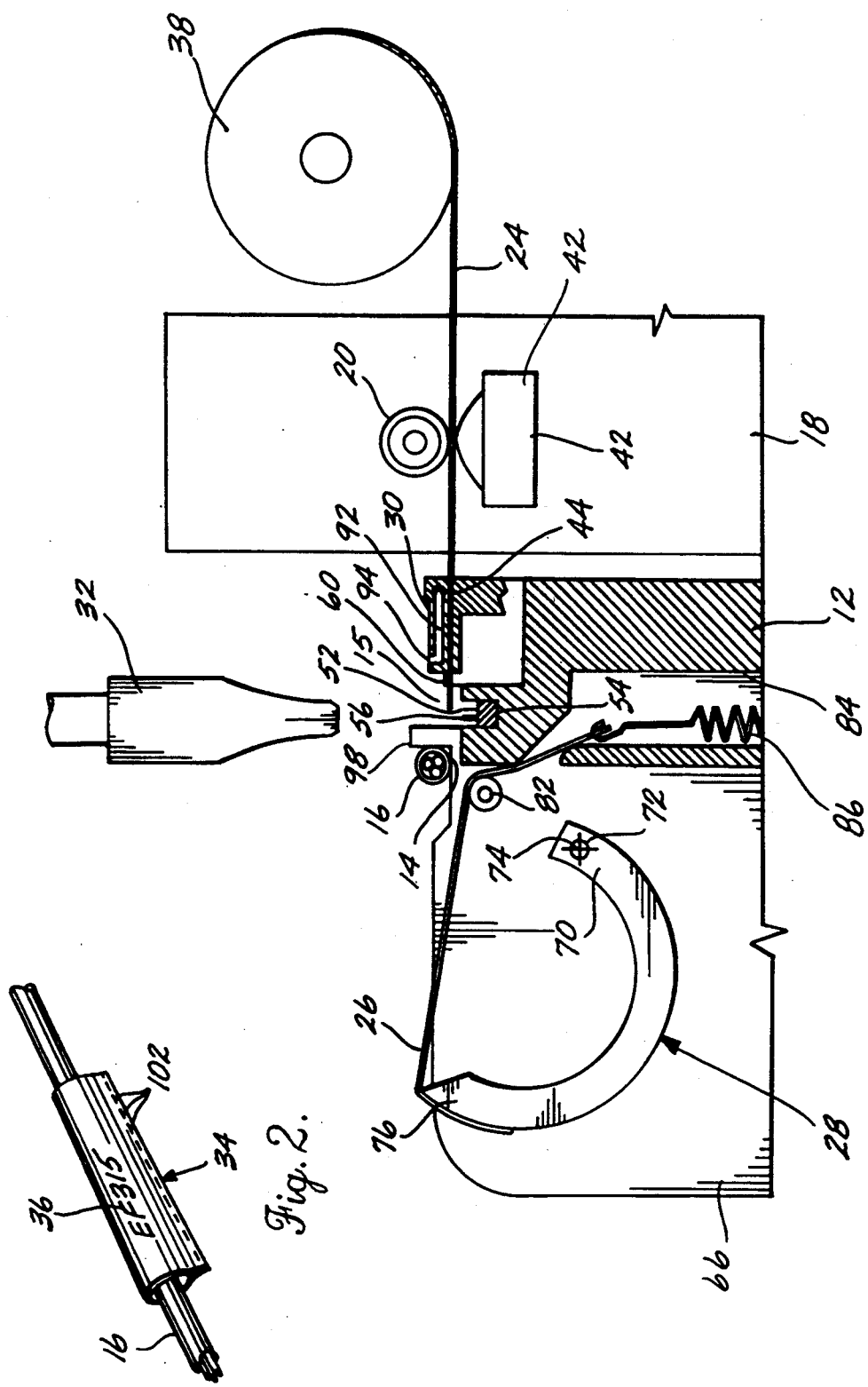

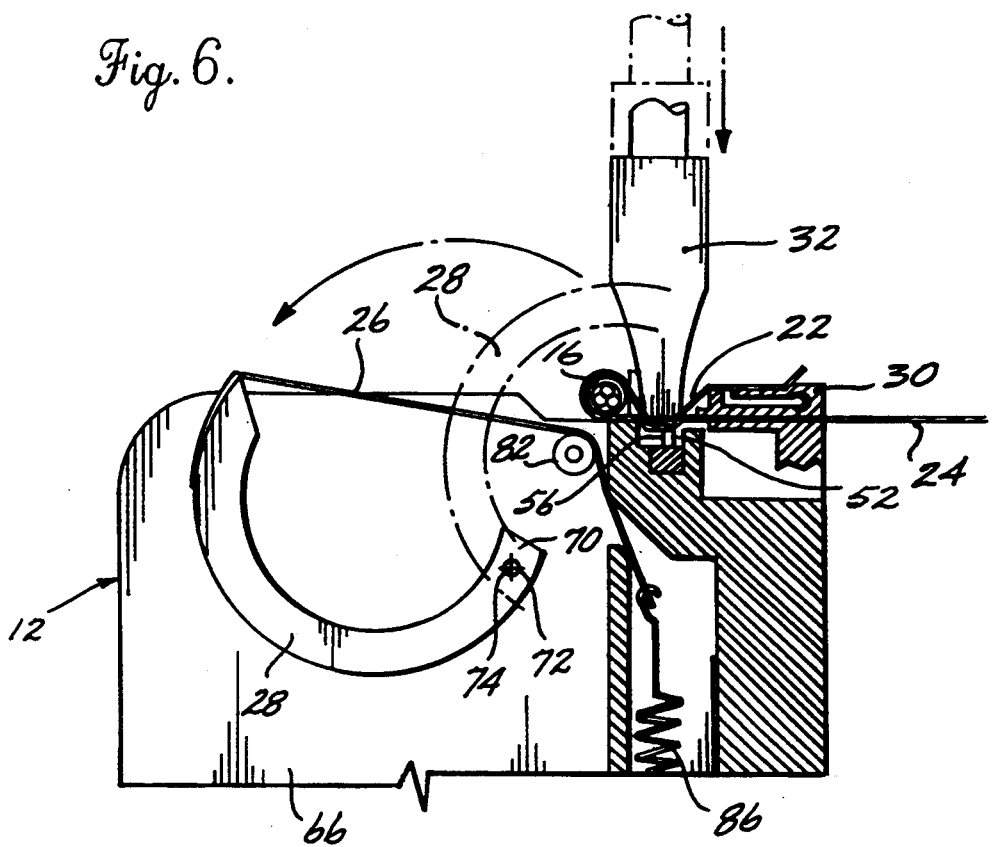

METHOD AND APPARATUS FOR FORMING A WELDED IDENTIFICATION SLEEVE

RELATIONSHIP TO OTHER APPLICATION

This application is a continuation-in-part of prior U.S. patent application Ser. No. 07/723,246 filed Jun. 28, 1991, now U.S. Pat. No. 5,275,674, from which filing date priority is hereby claimed.

TECHNICAL FIELD OF THE INVENTION

The present invention is directed to methods and apparatus for identifying objects and, more particularly, to methods and apparatus for applying identification sleeves to elongate objects.

BACKGROUND OF THE INVENTION

Many manufacturing processes require placement of identification tags on thin, elongate objects, such as wires, hoses and pipes. In complex communication and electric power distribution systems, individual wires within wiring harnesses must be correctly identified for proper connection of subsystems. Similarly, in hydraulic and pneumatic systems, hydraulic and pneumatic hoses and tubes also must be identified for correct coupling. Tags must be applied in a manner to identify individual objects with certainty, while not harming the object nor interfering with interconnection or function of the objects.

Conventional techniques for identifying individual conductors within wiring harnesses, such as those used in aircraft electrical systems, involve the placement of heat shrinkable, tubular identification sleeves over individual conductors, conductor-bundles, or cables. The tubular sleeving, commonly referred to as heat shrink tubing, is made of polymeric material that has been previously expanded and that, when heated, shrinks down to its original dimensions to form a tight fit around the object over which it has been placed. A length of conventional heat-shrink tubing is first marked by embossing or printing with identification indicia, such as numerals or letters. The marked tubing is then cut into individual pieces of a desired length, which are then individually threaded onto the object to be identified. Individual handling, marking and application of cut tubing is cumbersome and time-consuming.

An alternative type of conventional sleeve has been developed that is somewhat easier to mark with identification indicia. Two flat sheets of heat shrinkable material are periodically welded together along transverse lines to form a welded sheet of flat sleeves. The welded sheet can then be printed upon to place indicia on each sleeve. Individual sleeves are cut from the sheet prior to placement on wires or other objects to be identified.

Both heat-shrink tubing and flat welded sheets have the disadvantage of needing to be preprinted in advance with the identification indicia expected to be required for a particular manufacturing process. The individual operator then must select the correct preprinted sleeve corresponding to a particular wire to be identified. The requirement of preprinting and preparing individual sleeves is costly and time-consuming, and does not allow production flexibility with regard to changing identification requirements during a manufacturing run. Existing methods also do not enable printing on both sides of a piece of sleeving, as is sometimes desired, without turning over the sleeving.

An improved method for identifying objects is disclosed by U.S. Pat. No. 4,770,729, entitled "Method of Making a Welded Sleeve Identification" and assigned to the assignee of the current application. The method involves the printing of indicia on the leading end of a continuous strip of heat-shrinkable material, cutting indicia bearing pieces from the strip, and wrapping the pieces around an object to be identified. Each cut piece is gripped by a multiple joint arm and then moved to a position over top of the object to be identified, whereupon it is wrapped around the wire in a generally U-shaped configuration. The outwardly extending ends of the U-shaped pieces are then ultrasonically welded together adjacent the object to form a welded sleeve that can later be heat-shrunk into place. While this method represents a significant improvement over other prior art methods, the method has a disadvantage associated with handling the individual cut pieces of material and potential problems associated with mispositioning cut pieces when they are wrapped around the object to be identified.

A conventional device for strapping a bundle of wires is disclosed in U.S. Pat. No. 4,265,687 to Mercer et al., assigned to the assignee of the present application. The Mercer et al. device is intended for strapping a bundle with ultrasonically welded tape, rather than marking a bundle or other items with indicia bearing material. It is a manually activated device that feeds a strip of ultrasonically welded tape through a complex path over a plurality of rollers. The tape is then wound in a spiral around the bundle to be wrapped. A plunger is moved against the tape at one point of the feed path to draw the tape tightly around the bundle. This method of strapping bundles of items may be cumbersome to use due to the complex path through which the tape must be threaded. Additionally, the spiral wrapping of the bundle with the tape results in wasted material.

SUMMARY OF THE INVENTION

A first preferred embodiment of the present invention provides a method and apparatus for forming an identification sleeve around an elongate object. An end portion of a continuous strip of identification indicia-bearing, ultrasonically weldable material is fed past an elongate object to be identified. The end portion of the material strip is then wrapped around the elongate object to overlap an adjacent second portion of the material strip. The end portion of the material strip is ultrasonically welded to the overlapped second portion of the material strip to form an indicia-bearing, tubular sleeve, which is then severed from the material strip.

A second preferred embodiment of the present invention provides an apparatus for forming a welded identification sleeve around an elongate object from a continuous strip of weldable material. The apparatus includes a base defining a receiving surface that receives the elongate object to be identified. A reversible material strip feeder is positioned adjacent the receiving surface of the base and is capable of selective operation in an advance mode to advance the lead portion of a weldable material strip toward a first end of the base and transversely past the elongate object. The reversible material strip feeder is also operable in a reverse mode in which the material strip is retracted away from the first end of the base. A guide member mounted on the base and positionable adjacent the receiving surface of the base guides the lead portion of the material strip, when advanced by the material strip feeder, around the elongate object whereby the lead portion of the material strip overlaps the material strip so that the material strip is wrapped around the elongate object. A gripper mechanism mounted on the base grips the wrapped leading end portion of the material strip during operation of the material strip feeder in the reverse mode to tighten the wrapped material strip around the elongate object. A welder mounted on the base welds the wrapped lead portion of the material strip to the material strip, thereby forming a tubular sleeve around the elongate object. A cutter mounted on the base cuts the tubular sleeve from the material strip.

In a further aspect of the present invention, the apparatus includes a tension sensing device for sensing tension in the wrapped material strip. The apparatus further includes a controller for automatically controlling tensioning of the wrapped material strip during tightening of the wrapped material strip around the elongate object, in response to the tension sensing device.

In a further aspect of the present invention, the apparatus welder includes an energy imparting weld member disposed in proximity to the receiving surface of the base that is positionable so that a weld edge of the weld member contacts a first side of the overlapped material strip and lead portion of the material strip. The welder further includes a weld anvil assembly that is disposed in proximity to the receiving surface of the base and positionable to contact a second side of the overlapped material strip and lead portion of the material strip. The material strip is weldable between the weld member and the weld anvil assembly to form a tubular sleeve around the elongate object. The weld anvil assembly includes a carrier member and an anvil plate pivotably connected to the carrier member. The anvil plate defines a weld edge that is positionable to contact the second side of the overlapped material strip and lead portion of the material strip during welding, the anvil plate pivoting relative to the carrier member to align the weld edge of the anvil plate with the weld edge of the weld member. The weld edge of the anvil plate thus automatically aligns itself relative to the weld edge of the energy imparting weld member.

The present invention also provides a method for forming a welded identification sleeve around an elongate object from a continuous strip of weldable material. The method involves positioning an elongate object on the receiving surface of a base. The lead portion of a weldable material strip is advanced using a reversible material strip feeder operated in an advance mode. The lead portion of the weldable material strip is advanced toward a first end of the base and transversely past and wrapping around the elongate object, whereby the lead portion of the material strip overlays the material strip. The wrapped lead portion of the material strip is gripped, and the reversible material strip feeder is operated in a reverse mode to retract the material strip away from the first end of the base, tightening the wrapped material strip around the elongate object. The lead portion of the material strip is then welded to the material strip to form a tubular sleeve around the elongate object, and the tubular sleeve is cut from the material strip. In a further aspect, tightening of the wrapped material strip prior to welding is automatically controlled in response to tension sensed in the material strip.

In a still further aspect of the present invention, the method involves welding a continuous strip of weldable material to form tubular sleeve around an elongate object. The material strip and an excess length of the welded lead portion of the material strip are then severed from the tubular sleeve. The severed excess length of the welded lead portion of the material strip is then automatically conveyed from the receiving surface of a base that receives the elongate object to a waste depository.

BRIEF DESCRIPTION OF THE DRAWINGS

The foregoing and other advantages and features of the invention will be better understood from the following detailed description, taken in conjunction with the accompanying drawings, wherein:

FIG. 2 is a pictorial view of a welded identification sleeve formed to encircle a conductor bundle in accordance with the present invention;

FIG. 3 is a side elevation, partial cross-sectional, schematic diagram of the welded sleeve applicator shown in FIG. 1, with the reciprocating guide shown in the retracted position prior to feeding the material strip;

FIGS. 4 through 7 are a sequence of views corresponding to FIG. 3 and depicting the operation of the welded identification sleeve applicator during the steps of f ceding, wrapping, welding, and severing the identification sleeve;

DETAILED DESCRIPTION OF THE PREFERRED EMBODIMENT

Figure 1:
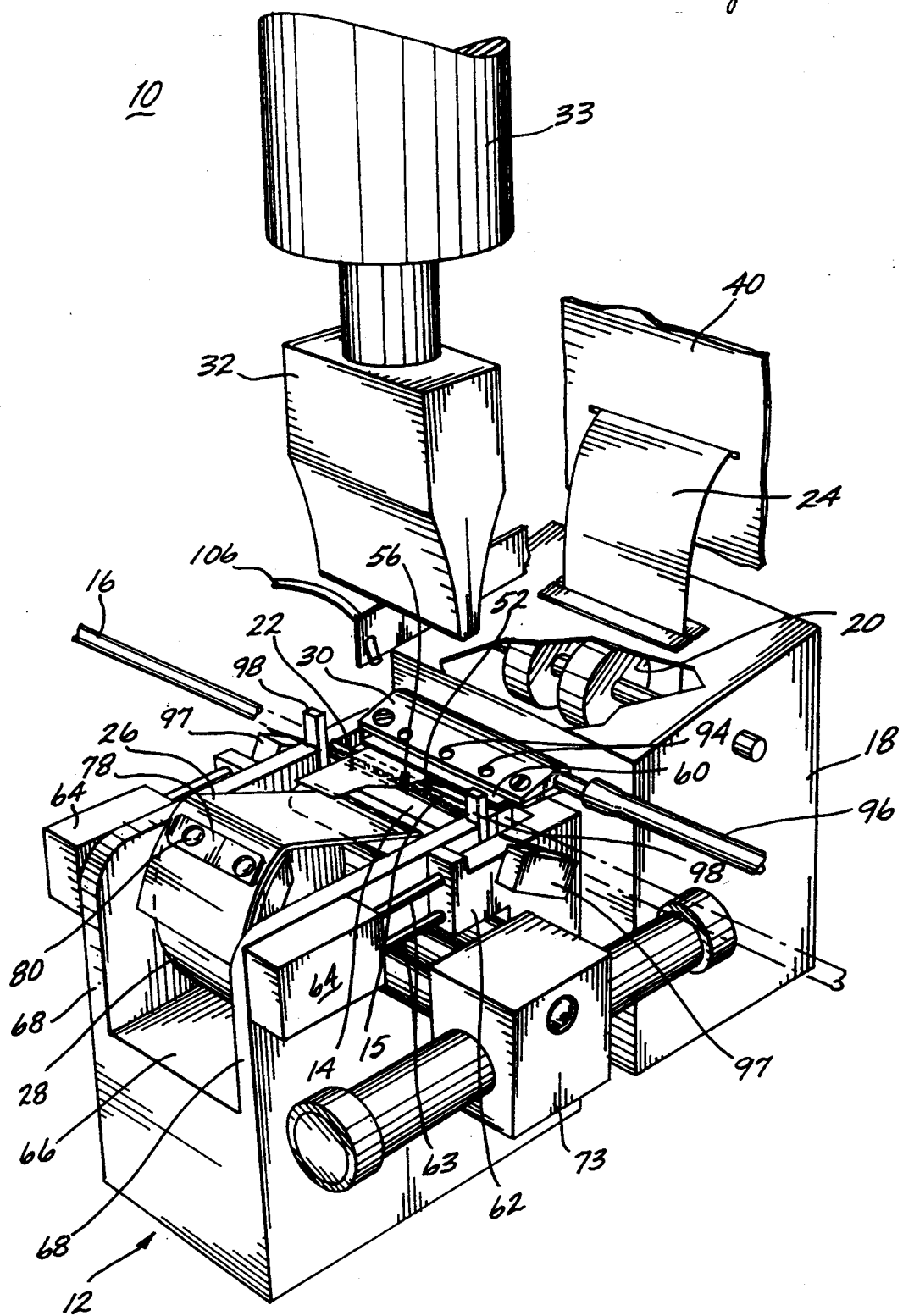
FIG. 1 is a pictorial view of a preferred embodiment of a welded identification sleeve applicator constructed in accordance with the present invention.

A first preferred embodiment of a welded identification sleeve applicator 10 constructed in accordance with the present invention is shown in FIG. 1. The applicator 10 includes a base 12 having a receiving region 14 for receiving an elongate object, such as the bundled electrical conductor 16 shown in FIG. 1. The base also has a weld region 15, adjacent the receiving region 14, for welding an identification sleeve around the received elongate object. The applicator 10 further includes a printer 18 having friction rollers 20 for selectively feeding a leading end portion 22 of a continuous strip 24 of ultrasonically weldable material. Identification indicia, such as numerals, letters, geometric symbols or colors, are printed or embossed onto the material strip 24 by the printer 18. The friction rollers 20 advance the leading end portion 22 of the material strip 24 over the weld region 15, and then over the receiving region 14 of the base 12, under the conductor 16.

The applicator 10 further includes a mechanism for wrapping the leading end portion 22 of the material strip 24 about the conductor 16. The mechanism includes a flexible wrapping strap 26 and a pivot arm 28, both secured to the base 12 as shown in FIGS. 1 and 3. When the leading end portion 22 of the material strip 24 has been fed under the conductor 16 and over the receiving region 14 of the base, it is received on top of and overlies the flexible wrapping strap 26, as shown in FIG. 1. The material strip 24 is thus positioned to be wrapped about the conductor 16 and welding in place to form a tubular sleeve around the conductor.

As described more fully below, the pivot arm 28 is selectively pivotable to manipulate the strap 26 to wrap the leading end portion 22 of the material strip 24 about the conductor 16. The leading end portion 22 is retained in this wrapped position by a vacuum drawn through a reciprocating guide assembly 30. The pivot arm 28 and wrapping strap 26 are then withdrawn. An ultrasonic welding horn 32 of an ultrasonic welder 33 is lowered to weld the material strip 24 to itself, forming a tubular welded sleeve 34 bearing identification indicia 36, as shown in FIG. 2. In the preferred embodiment of an applicator 10 described herein, the sleeve 34 is simultaneously severed from the material strip 24 as it is welded around the conductor 16.

Referring now to FIGS. 1 and 3 to more fully describe the construction of the applicator 10, the material strip 24 is supplied from a continuous roll 38 (FIG. 3) or other source of material strip housed within a supply housing 40 (FIG. 1). The material strip 24 is formed from any ultrasonically weldable material capable of being printed, embossed, heat-stamped or otherwise marked. Most preferably, the material strip 24 comprises a strip of a heat-shrinkable thermoplastic material, such as heat-shrinkable polyolefin plastic. Various other materials would be suitable, such as polyvinylchloride. The ultrasonically weldable material need not be heat shrinkable if it is not necessary for a particular application to tightly fit the identification sleeve on the object to be identified.

The material strip 24 is fed into a conventional printer 18 included rearwardly of base 12. As viewed in FIG. 1 and used herein throughout, rearward refers to the end of the base 12 closest in proximity the printer 18, while forward refers to the end of the base 12 furthest from the printer 18. The printer 18 includes a mechanism for feeding the material strip 24 through the printer and remainder of the applicator 10, such as rubber-coated friction rollers 20. Various other feed mechanisms mounted elsewhere on the applicator could be used in conjunction with or in lieu of the rollers 20, such as a frictional reciprocating foot or a vacuum gripping device. The printer 18 further includes a print head 42, such as a dot matrix impact print head shown schematically in FIG. 3, to mark indicia on the strip 24. It should be readily apparent that a printer utilizing another conventional type of printing technology could be utilized, such as an ink jet printer or thermal printer, if compatible with the particular weldable sleeve material.

The material strip 24 is selectively fed from the printer 18 to the base 12, where it is received within a slot 44 foraged longitudinally through the reciprocating guide 30, as shown in FIG. 3. The guide 30 serves to guide the first end 22 of the material strip 24 over the weld region 15 of the base and under the conductor 16 when the strip is fed by the rollers 20 of the printer 18.

A transversely disposed cutting blade 52 projects upwardly from a transverse recess 54 formed in the upper surface of the weld portion of the base 12, between the receiving region 14 of the base and the rearward end of the base 12. An ultrasonic welding pattern 56 is also mounted within the transverse recess 54, between the cutting blade 52 and the receiving region 14 of the base, parallel to the cutting blade 52. As shown in FIG. 1, the welding pattern 56 comprises a vertical metal plate having an upper edge that is contoured in a saw-toothed fashion, forming alternating high and low flat spots. The welding pattern 56 and cutting blade 52 project upwardly and are aligned below the ultrasonic welding horn 32 suspended above the base 12. The cutting blade 52 preferably projects upwardly slightly more than the welding pattern 56, by a distance approximately equal to twice the thickness of the material strip 24. The welding pattern 56 and cutting blade 52 are horizontally spaced slightly apart from each other. The amount of spacing should be as small a distance as possible, such as less than approximately 1 mm apart to avoid the formation of a large ridge next to the weld line formed on the sleeve.

Figure 4:
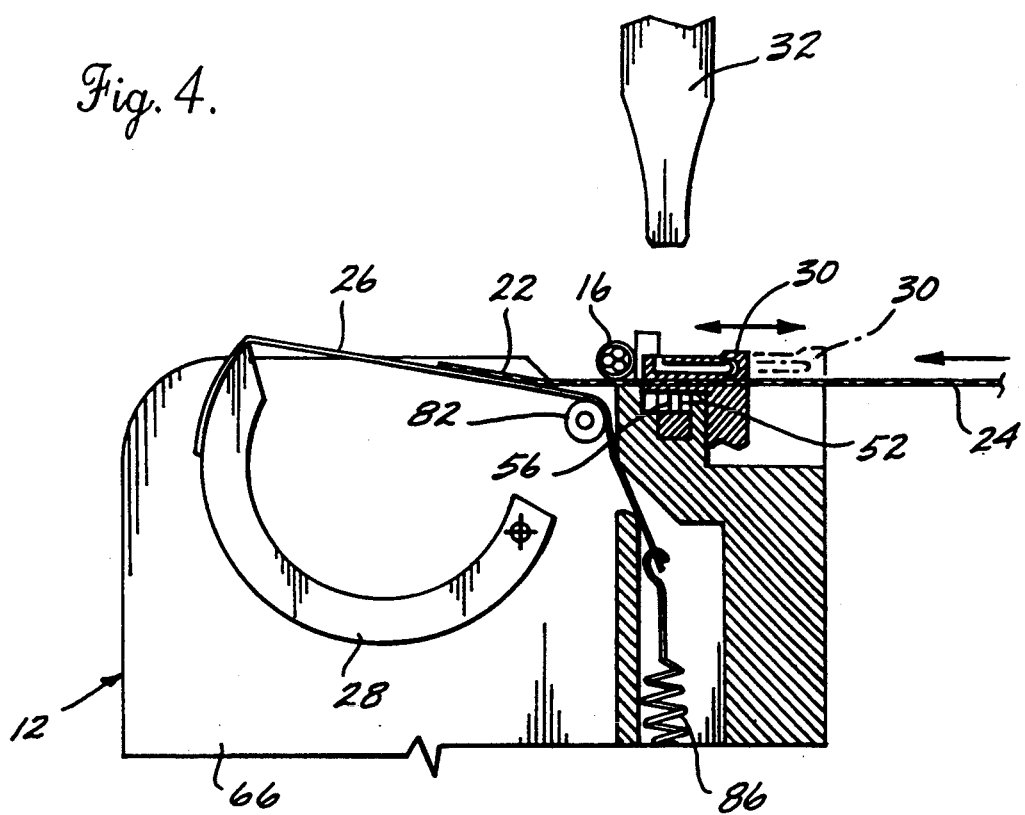

Referring still to FIG. 3, the leading end portion 22 of the material strip 24 projects outwardly through two spaced-apart horizontal flanges 60 formed on the guide 30 on either side of the forward edge of the slot 44. The guide 30 reciprocates between a rearward, retracted position adjacent the printer 18, as shown in FIG. 3, and a forward, advanced position adjacent the receiving region 14 of the base 12, as shown in FIG. 4. The guide 30 moves to the advanced position to cover the cutting blade 52 and welding pattern 56 during feeding of the material strip 24, preventing the leading end portion 22 of the material strip from catching on the upwardly projecting blade 52 and welding pattern 56. After the leading end portion 22 of the material strip 24 has been fed onto the receiving region 14 of the base, the guide 30 is withdrawn to the retracted position so as to not interfere with the welding and severing of the strip 24.

This reciprocating motion of the guide 30 is enabled by mounting the guide 30 atop two slidable carriage plates 62 mounted on either side of the base 12, as shown in FIG. 1. Each carriage plate 62 is connected to the shafts 63 of a pneumatic actuator 64 secured to either side of the forward end of the base 12. When the shafts 63 are retracted and extended, the carriage plates 62 and the guide 30 slide forwardly and rearwardly relative to the base 12.

A large recess 66 is formed centrally in the base 12 forwardly of and adjacent to the receiving region 14. The base 12 defines first and second vertical end walls 68 on either side of the recess 66. A first end 70 of the pivot arm 28 is non-rotatably mounted on a pivotal shaft 72 located within the recess 66. The shaft 72 extends from a rotary actuator 73 mounted externally on one end wall 68 of the base 12, through aligned openings formed in both end walls 68. The rotary actuator 73 is used to rotate the rod 72 and the pivot arm 28. One suitable rotary actuator is a rotary air cylinder available from Bimba Manufacturing Company, Monee, Ill., under the name "Pneu Turn." The rotary actuator converts pneumatic pressure to rotary motion to selectively rotate the pivot arm 28 about a central pivot axis 74 of the shaft 72. However, it should be apparent that other rotating means such as a reversible motor could be utilized to rotate the shaft and pivot arm.

Referring to FIG. 3, the pivot arm 28 has a generally semi-cylindrical configuration, curving from the first end 70 to a second end 76. The flexible wrapping strap 26 has a first end that is secured to the second end 76 of the pivot arm 28 by a plate 78 and conventional fasteners 80. The flexible strap 26 passes over the upper side of a transverse rod 82 that is mounted between the end walls 68 within the recess 66, adjacent the receiving region 14 of the base 12. The second end of the flexible wrapping strap 26 then passes into a cavity 84 formed internally within the base 12 below the receiving region 14. The second end of the flexible wrapping strap 26 is secured within the cavity 84 to one end of a coil spring 86, with the other end (not shown) of the coil spring 86 extending downwardly into the cavity 84, where it is secured to the base 12. The coil spring 86 places tension on the flexible wrapping strap 26 to keep the strap taut regardless of the position of the pivot arm 28.

Figure 5:
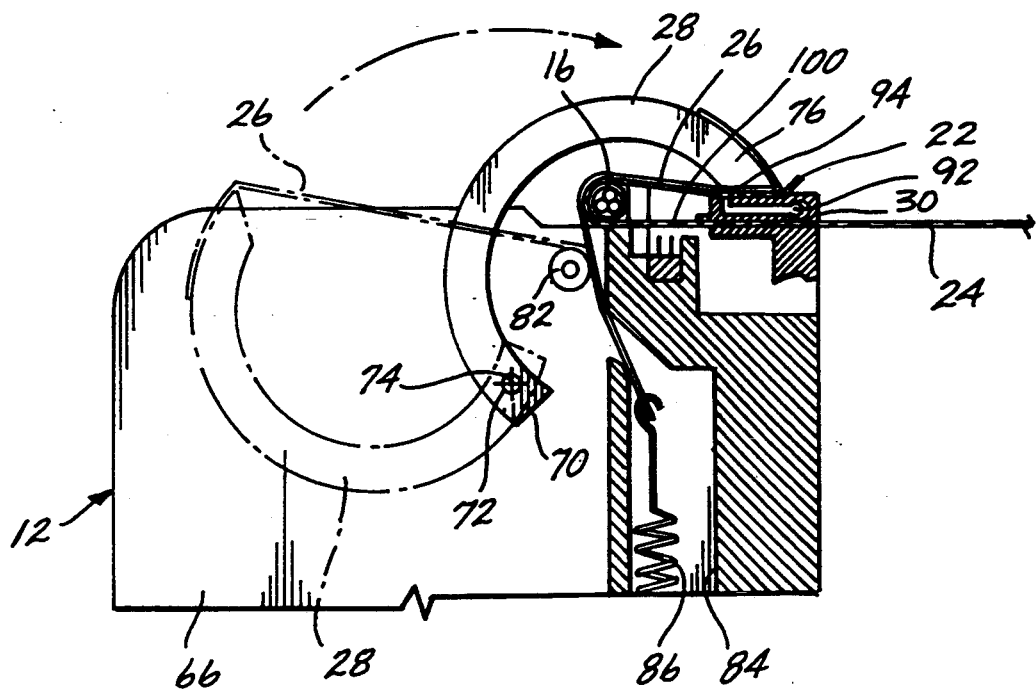

Referring to FIG. 5, when the pivot arm is pivoted upwardly about the pivot axis 74, the strap 26 and overlying portion of the material strip 24 are partially wrapped around the received conductor 16. Because of the curvature of the pivot arm 28, the flexibility of the wrapping strap 26, and the strap biasing spring 86, the wrapping strap 26 is able to accommodate a range of diameters of elongate objects, e.g., conductors, tubes, hoses, and the like, to be identified. The spring 86 lengthens and retracts as necessary to keep the strap 26 taut regardless of whether the strap is wrapped around small or large diameter objects. The spring 86 also allows adjustment of the tension on the strap 26.

The wrapping strap 26 is formed from a flexible material that conforms to the outer perimeter of the conductor 16 or other object to be identified. Preferably, the strap is composed of an elastomeric material, such as silicone rubber. The strap is thus able to stretch to the extent necessary to conform to the peripheral configuration of the object to be identified. It should be apparent that rather than using a spring 86, an elastomeric wrapping strap capable of undergoing a large degree of elongation could be used by itself, with the second end of the strap being secured directly to the base. The elongation of the strap must be sufficient to accommodate different sizes of objects to be identified. However, when a deformable biasing member such as spring 86 is used, the flexible strap need not stretch and can be reinforced with a fiber if desired. Reinforcement of the strap 26 has not been found necessary in one actual embodiment of this invention.

When the strap 26 has been wrapped around the conductor 16 as shown in FIG. 5, the leading end portion 22 of the material strip 24 contacts the upper surface of the reciprocating guide 30. The guide 30 includes a plurality of vacuum passages 92 that terminate in vacuum orifices 94 defined in the upper surface of the guide 30. The vacuum passages 92 are in fluid communication with a vacuum line 96 (FIG. 1) attached between the guide 30 and a vacuum source 95. After the strap 26 wraps the material strip 24 about the conductor 16, a vacuum is drawn through the guide 30, resulting in the leading end portion 22 of the strip 24 being drawn onto the upper surface of the guide 30. The pivot arm 28 can then be returned to its lowered position, unwrapping the strap 26 from the wrapped material strip 24 to enable welding and severing of an identification sleeve, as shall be described subsequently.

Operation of the welded sleeve applicator 10 is controlled by a controller 88, such as a programmable computer. The welded sleeve applicator 10 is operated cyclically to individually wrap conductors 16 or other objects. Referring to FIG. 1, a sleeve wrap and weld cycle is initiated by closure of two switches 97, mounted on the carriages 62 on either side of the base 12.

Referring to FIGS. 1 and 3, the receiving region 14 of the base 12 includes two stops 98 projecting upwardly from either side of the base 12, forwardly of the transverse recess 54. The conductor 16 or other elongated object to be identified is received in the corners formed by the top of the base 12 and the stops 98. The switches 97 are closed by pressure of the conductor 16 when an operator places the conductor 16 onto the top of the base 12 against the stops 98.

Figure 8:
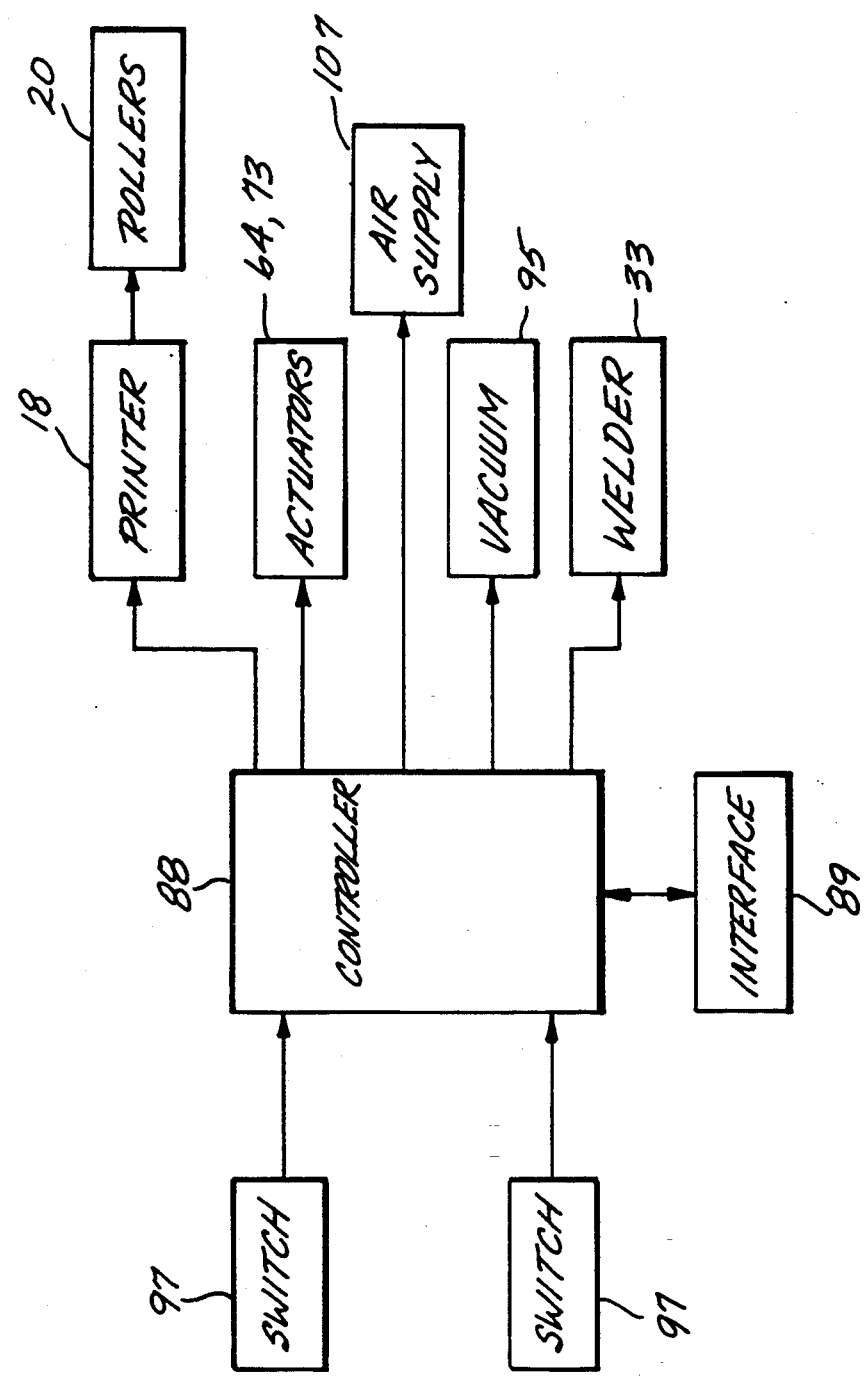
FIG. 8 is a schematic block diagram of the controller and controlled elements of the welded identification sleeve applicator of FIG. 1.

Referring to the block diagram of FIG. 8, closure of the switches 97 signals the controller 88 to start a cycle. The controller 88 then communicates with the printer 18 to initiate printing of indicia on the material strip 24. The indicia that are marked are determined by instructions previously entered by an operator through an interface 89, such as a keypad. After printing, the controller 88 communicates with the printer 18 to activate the rollers 20 to feed the material strip 24.

The controller 88 also instructs the pneumatic actuators 64 to advance, and then retract, the guide 30 during feeding of the material strip 24. After feeding is completed, the controller 88 instructs the rotary actuator 73 to pivot the pivot arm 28, wrapping the strap 26 around the conductor 16. The controller 88 then instructs the vacuum source 95 to draw a vacuum through the guide 30, and instructs the rotary actuator 73 to pivot the pivot arm 28 back to its initial position. The controller 88 then instructs the welder 33 to lower the welding horn 32 and weld and cut the material strip 24.

OPERATION OF FIRST PREFERRED EMBODIMENT

The operation of the welded sleeve applicator 10 will now be described with reference to FIGS. 3-7. Referring first to FIG. 3, after completion of a previous wrap and weld cycle, the guide 30 is in the retracted position. Prior to a new wrap and weld cycle, the leading end portion 22 of the material strip 24 remains threaded through the slot 44 in the guide 30. A new wrap and weld cycle is initiated by placing the conductor 16 on the receiving region 14 of the base 12, and depressing the switches 97 as previously described. The controller 88 has been preprogrammed with the indicia desired to be marked on the sleeve corresponding to the conductor 16. Upon initiation of the cycle, the printer 42 prints the desired indicia on the underside of the material strip 24, which is then advanced by rotation of the friction rollers 20.

Referring next to FIG. 4, as the material strip 24 is advanced through the applicator 10, the reciprocating guide 30 moves to the advanced position to prevent the forward edge of the leading end portion 22 of the material strip 24 from catching on the cutting blade 52 and the welding pattern 56. The material strip 24 is advanced until the leading end portion 22 has been fed over the weld region 15 and receiving region 14, and passed under the conductor 16 to overlie the wrapping strap 26. At this point, the portion of the material strip 24 marked with the indicia is located starting directly below or just forwardly of the conductor 16. The reciprocating guide 30 then moves back to the retracted position, as shown in phantom in FIG. 4.

Referring next to FIG. 5, the pivot arm 28 then pivots on rod 72 about the pivot axis 74, upwardly from the position shown in phantom in FIG. 5, to a position wherein the second end 76 of the pivot arm 28 arcs over the conductor 16. In this position, the wrapping strap 26 and leading end portion 22 of the material strip 24 are wrapped partially about the conductor 16. The flexible wrapping strap 26 is maintained taut by the spring 86, and adjusts corresponding to the diameter of the conductor 16.

In this wrapped configuration, the leading end portion 22 of the material strip 24 overlies an adjacent second portion 100 of the material strip 24, directly over the weld region 15 of the base 12. Rearwardly of the weld region 15, the leading end portion 22 of the material strip 24 contacts the upper surface of the guide 30, and is retained by a vacuum drawn through the vacuum passages 92.

Referring next to FIG. 6, the pivot arm 28 then returns from this upward position, shown in phantom in FIG. 6, to its original position within the recess 66 to unwrap the wrapping strap 26. The leading end portion 22 of the material strip 24 is retained in the wrapped configuration by the guide 30. The ultrasonic welding horn 32 is then lowered to compress the overlying portions of the material strip 24 between the downward tip of the welding horn 32, and the cutting blade 52 and welding pattern 56.

The ultrasonic welder 33 is activated to weld the overlying portions of the material strip 24 together by ultrasonic vibration, as is well known in the art. A welded bond line 102 is thus formed in the material strip 24 between the welding pattern 56 and the welding horn 32. Referring to FIG. 2, this welded bond line 102 comprises a series of spaced-apart welded spots corresponding to the saw-toothed configuration of the welding pattern 56. Referring again to FIG. 6, vibration of the material strip 24 against the cutting blade 52, as the material strip 24 is ultrasonically welded, causes both the leading end portion 22 and second end portion 100 of the material strip 24 to be cut. The welded sleeve 36 is thus simultaneously severed from the remainder of the material strip 24 as the sleeve is welded.

Referring to FIG. 7, the welding horn 32 is then retracted upwardly, and the conductor 16 with the indicia-marked welded sleeve 34 formed thereon can be removed from the applicator 10. Referring to FIG. 1, the applicator 10 includes a pneumatic tube 106 from a pneumatic supply 107 (FIG. 8). The tube 106 is positioned to deliver a blast of air to the welding region 15 of the base 12. Immediately after completion of the weld, the controller 88 instructs the pneumatic supply 107 to deliver a blast of air through the tube 106 to blow away a surplus portion 104 of the material strip 24 produced by the wrapping cycle.

The entire wrapping cycle, from placement of the conductor 16 to welding and severing the sleeve 34, takes only on the order of 2 seconds to complete. Thus, a large number of conductors 16 can be rapidly marked in sequence, with interruption only to reinstruct the controller 88 when it is necessary to change the indicia to be marked.

The present invention has been described thus far in relation to a first preferred embodiment of an applicator 10. However, various alterations to the first preferred embodiment may be made in accordance with the present invention. For example, rather than using a vacuum drawn through the guide 30 to retain the wrapped material strip 24, a hold-down finger clamp could be lowered onto the wrapped leading end portion 22 to clamp the leading end portion 22 in place. The use of a clamp to retain the wrapped strip 24 may be preferred as the clamping force is applied vertically, rather than the use of a vacuum which could permit some horizontal slippage of the retained strip 24 under some circumstances.

As a further example of an alteration, the line printer 18 could be operated in a reverse-feed mode to eliminate the surplus portion 104 of the material strip 24 produced by each wrap and weld cycle. Thus, upon initiation of each cycle, the material strip would first be withdrawn into the printer 18 to mark the indicia on the leading end portion 22 of the strip in proximity to the edge of the strip. The printer would then feed the material strip back through the guide 30 and onto the base 12 for wrapping.

Figure 9:
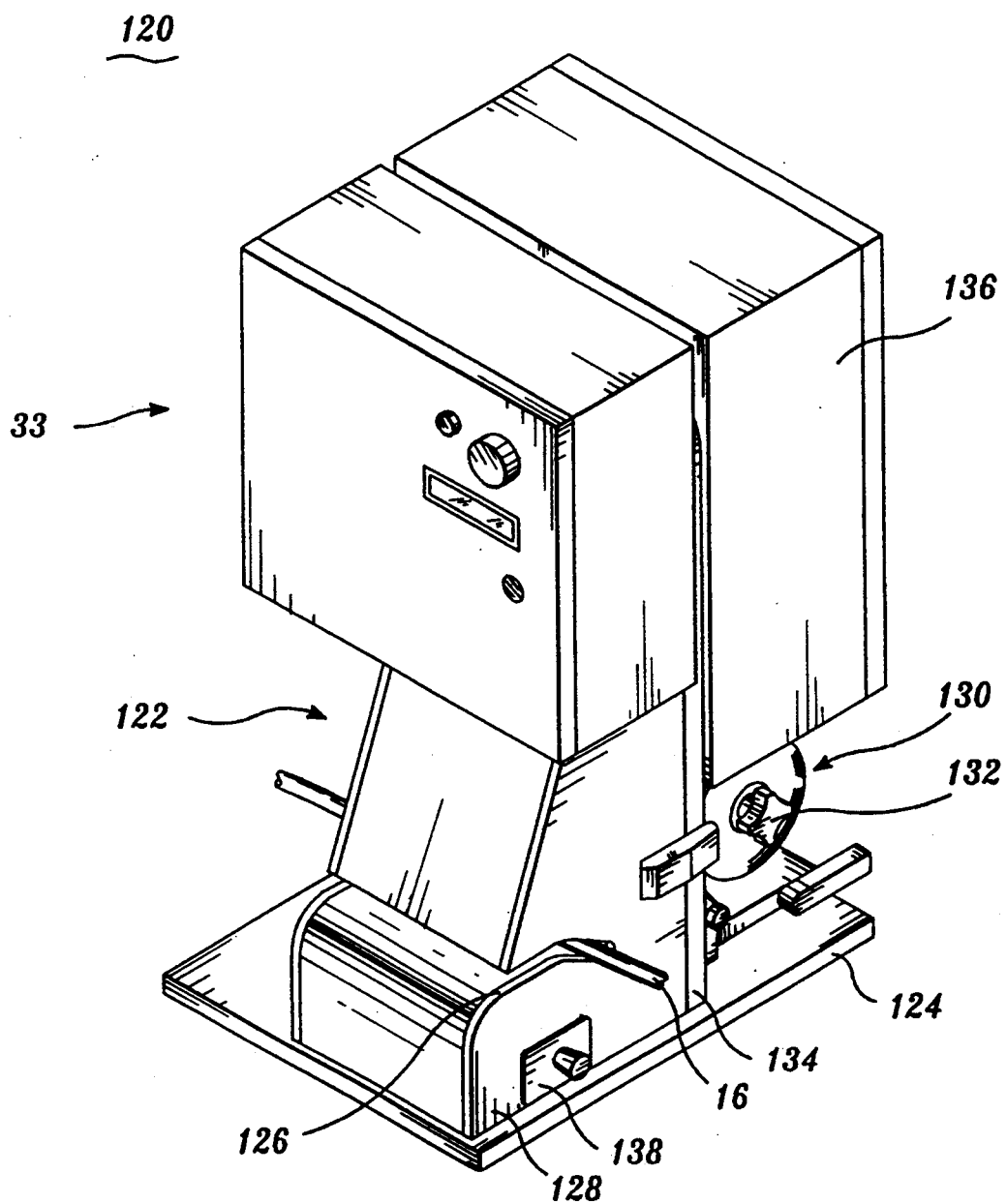
FIG. 9 provides an isometric view of an alternate preferred embodiment of a welded identification sleeve applicator constructed in accordance with the present invention.

A second preferred embodiment of the present invention incorporating these alternative features is shown in FIGS. 9 through 15. Referring first to FIG. 9, an alternate applicator 120 is shown and shall now be described. Those features of the applicator 120 in common with the previously described applicator 10 of FIG. 1 will not be described again, in order to avoid redundancy. Elements of the applicator 120 that are constructed substantially similar to elements of the applicator 10 will be referred to using the same identifying numeral.

The applicator 120 shown in FIG. 9 is enclosed within a housing 122 mounted on a base plate 124. An elongate object, such as a bundled conductor 16, is inserted transversely into a slot 126 formed in the side plates 128 of the housing 122. When so inserted, the conductor 16 depresses switches (not shown) that automatically start the wrap and weld cycle. A roll 130 of a weldable material strip 24 is mounted on a spindle 132 above the base plate 124. The leading end portion 22 of the material strip 24 is automatically fed past and around the conductor 16, as described subsequently. The material strip 24 is then welded by an ultrasonic welder 33 supported on a frame 134 above the base plate 124. The applicator 120 also includes a power supply and controller 88 (FIG. 12) housed within a cabinet 136 that is also supported by the frame 134. A drawer 138 mounted within the housing 122 above the base plate 124 receives excess segments of the material strip 24 that are generated during the welding and cutting operation, as shall be described below.

Figure 10:
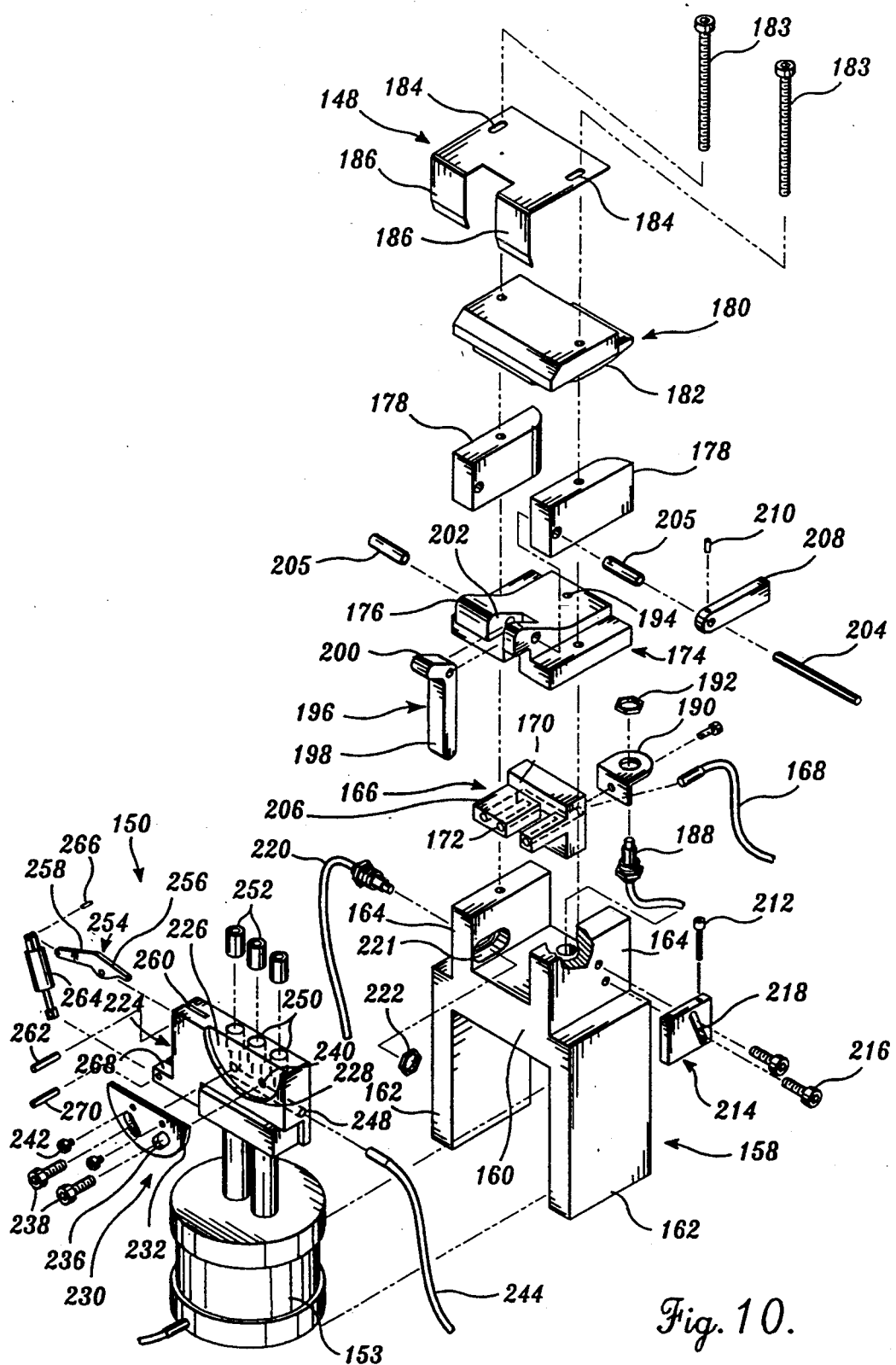
FIG. 10 is an exploded isometric view of the welded identification sleeve applicator of FIG. 9.
Figure 11:
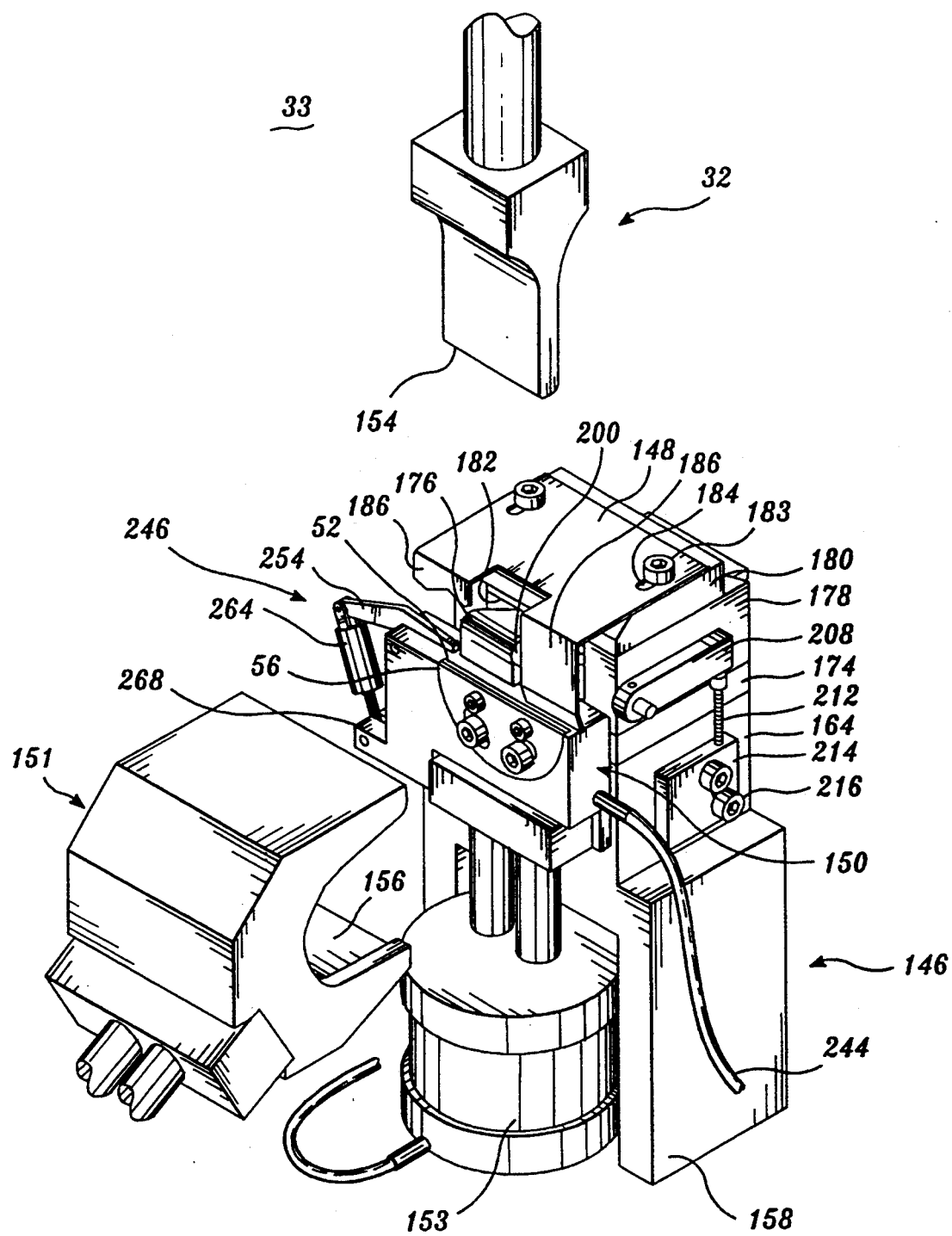
FIG. 11 is an isometric view of the welding and cutting subassembly of the applicator of FIG. 9, with support members for the arcuate material guide and welding horn being shown broken away.
Figure 12:
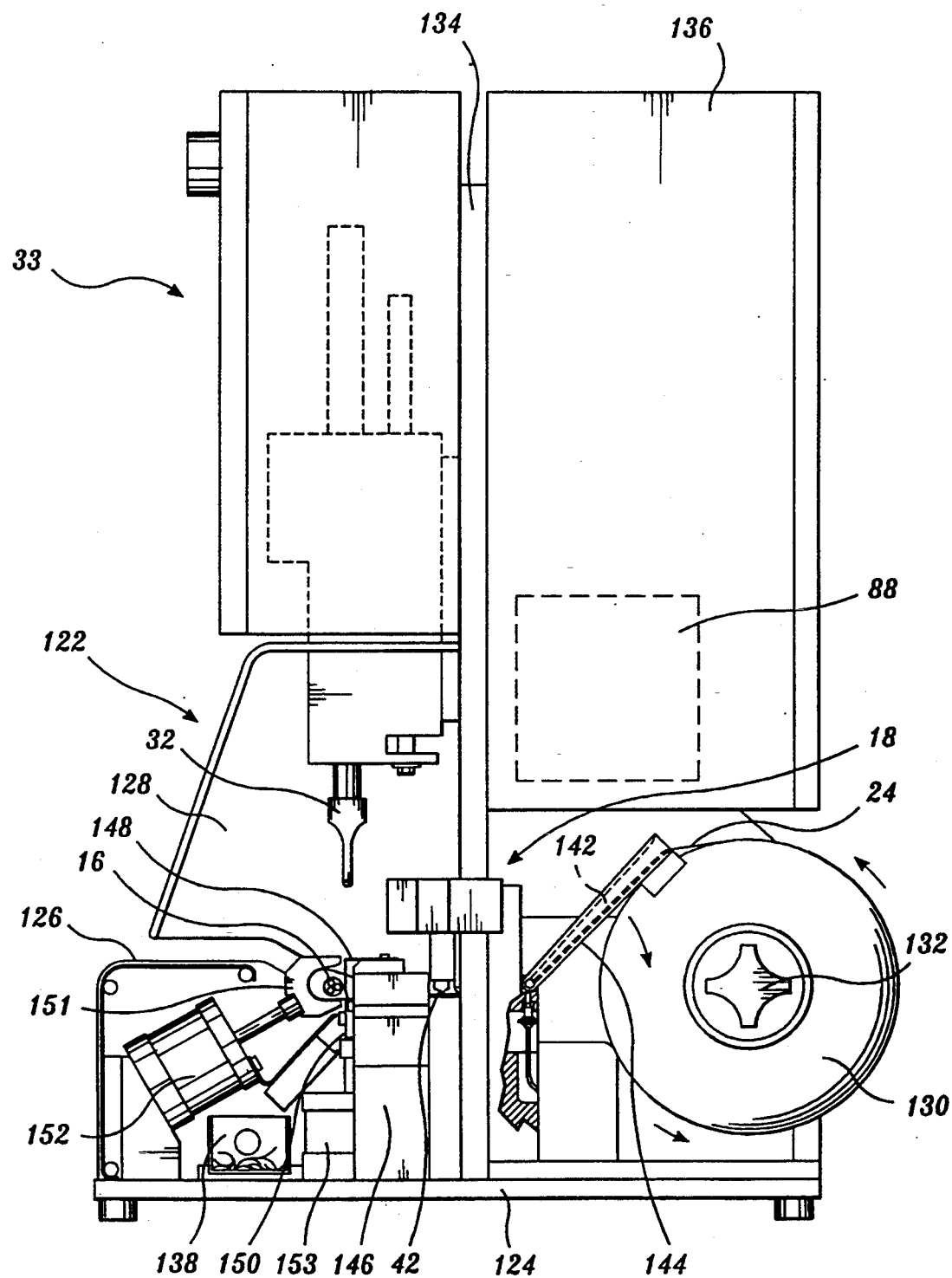
FIG. 12 is a side elevation view of the applicator of FIG. 9, with the side of the housing removed and portions of the welding path mounting block shown in cross section.

Referring now to FIGS. 10, 11 and 12, the components involved in handling and welding the material strip 24 will now be described. Referring initially to FIG. 12, as the material strip 24 unrolls from the roll 130, it passes through a guide way 142 formed longitudinally through a pivot arm 144. The pivot arm 144 is pivotally secured to the frame 134, and is biased by its own weight to bear downwardly on the roll 130, thereby preventing undesirable unraveling of the roll. As the roll 130 unwinds, the pivot arm 144 slides over the circumference of the roll. The material strip 24 then passes through the frame 134, past the print head 42 of the reversible line-feed printer 18 and through a guide assembly 146.

In FIG. 12, the conductor 16 is shown inserted into the slot 126 in the side plates 128 of the housing, which are illustrated as transparent for purposes of clarity. The conductor 16, when fully inserted into the slot 126, bears against a stop plate 148 mounted on the top of the guide assembly 146, to be described subsequently. The terminus of the slots 126 in the side plates 128 and the stop plate 148 define a receiving region for the conductor 16.

As the leading end portion 22 of the material strip 24 emerges from the guide assembly 146, it is received within an arcuate guide member 151, which is positioned by a pneumatic cylinder 152. After the material strip 24 is wrapped around the conductor 16, it is welded to form a tubular sleeve by bringing together the welding horn 32 of the welder 33 and a weld anvil assembly 150 mounted in front of the guide assembly 146. As used herein throughout, "forward" and "front" refer to the end of the housing 122 in which the slots 126 are formed, while "rearward" and "back" refer to the opposite end of the housing in which the roll 130 is mounted.

Referring to FIG. 11, the welding horn 32 defines a lower weld edge 154 that contacts one side of the wrapped material strip 24 during welding, with operation of the ultrasonic welding horn 32 imparting energy to the material strip to cause a weld. The ultrasonic welding horn 32 is raised and lowered relative to the weld anvil assembly 150 during use, as shall be described during the description of operation. During welding, the weld edge 154 of the welding horn 32 is mated with the welding pattern 56 and cutting blade 52, which are mounted on the top surface of the weld anvil assembly 150. The weld anvil assembly 150 is also positionable relative to the welding horn 32, by operation of a pneumatic cylinder 153 that raises and lowers the weld anvil assembly 150.

The material strip 24 is fed through the guide assembly 146, and is received within a channel 156 formed within the arcuate guide member 151. The guide member 151 has a generally "U-shaped" configuration in cross section, as can better be seen in FIG. 13, and causes the leading end portion 22 of the material strip 24 to bend and wrap loosely around the conductor 16. The guide member 151 can be moved angularly toward and away from receiving region defined around the conductor 16. Movement of the guide member 151 is powered by the pneumatic cylinder 152 (FIG. 12), and enables the guide member 151 to be withdrawn from the receiving region during placement and removal of conductors 16.

Referring now to FIGS. 10 and 11, construction of the guide assembly 146 will be described. The guide assembly 146 is assembled on a base block 158. The base block 158 has a horizontal center portion 160 and two parallel leg portions 162 that depend downwardly from either side of the center portion 160. The leg portions 162 are supported by the base plate 124. One side of the pneumatic cylinder 153 that powers positioning of the weld anvil assembly 150 is received between the leg portions 162, so that the weld anvil assembly 150 is positioned in front of the center portion 160 of the base block 158.

First and second parallel mounting flanges 164 depend upwardly from the top of the center portion 160 of the base block 158. A pneumatic manifold 166 is mounted on top of the center portion 160 between the mounting flanges 164. An air supply 168 connects to an inlet port 170 formed in the back of the pneumatic manifold 166. The inlet port 170 is connected by internal passages to three outlet ports 172 formed in the front face of the pneumatic manifold 166. The air supply 168 and the pneumatic manifold 166 are included to provide a blast of air to aid in removing excess segments of material strip 24 from the weld anvil assembly 150, as shall be described subsequently.

Referring still to FIG. 10, a guide plate 174 is mounted horizontally above and across the mounting flanges 164 of the base block 158. The top of the guide plate 174 defines a forwardly and upwardly sloping guide surface 176. The guide surface 176 is bordered by two side plates 178 that are mounted on top of the guide plate 174 in spaced parallel disposition. A cap 180 is secured on top of the side plates 178, and defines on its bottom a sloped guide surface 182 that is contoured correspondingly to the guide surface 176 of the guide plate 174. The cap 180, side plates 178 and guide plate 174 cooperatively define a guide passageway through which the material strip 24 passes.

Referring to FIG. 11, the stop plate 148 is secured to the top of the cap 180 by two screws 183 that pass through oblong holes 184 formed on each side of the stop plate 148. The screws pass through corresponding apertures formed in the cap 180, side plates 178, guide plate 174 and mounting flanges 164 of the base block 158 to secure the components together. Two spaced-apart fingers 186 depend downwardly from the forward edge of the stop plate 148. The fingers 186 are spaced apart so as to permit the material strip 24 to pass forwardly out from between the guide plate 174 and cap 180. The bottom tip of each of the fingers 186 is bent rearwardly.

When a conductor 116 is inserted into the applicator 120, it is pressed against the fingers 186, which orients the conductor 16 within the receiving region for proper welding. The forward and rearward disposition of fingers 186 can be adjusted as may be required by loosening the screws 183 and sliding the stop plate 148 to the extent permitted by the oblong apertures 184.

Figure 13:
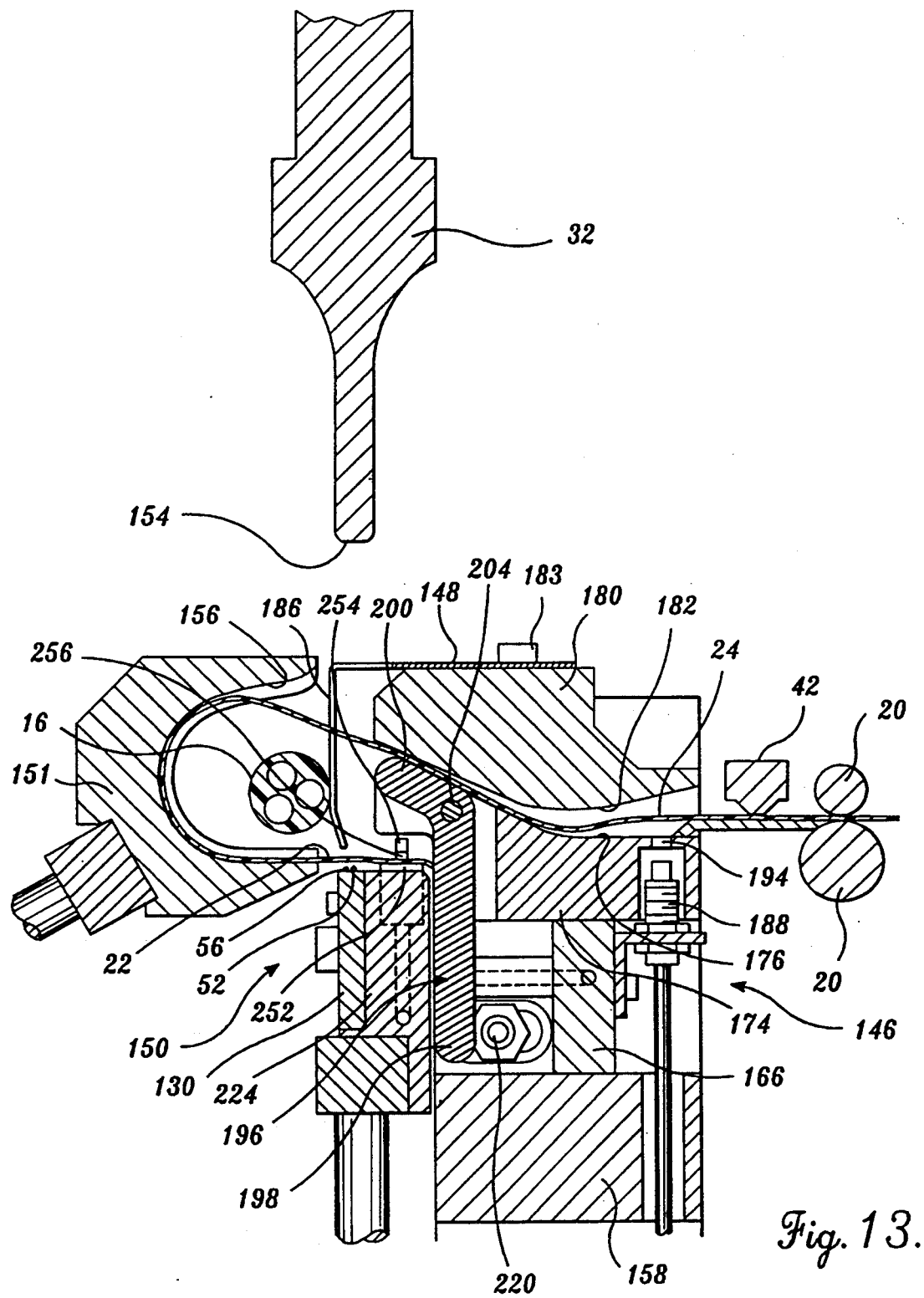
FIG. 13 is a side elevation schematic view, taken along a vertical cross section, of the applicator of FIG. 9 positioned after initial feeding of the material strip through an arcuate guide member and loosely around the object to be marked.

Referring to FIG. 10 as well as the cross-sectional view of FIG. 13, the guide assembly 146 also includes a sensor to detect whether or not the material strip 24 is present within the guide passageway defined between the guide plate 174 and the cap 180. An optical sensor 188 is mounted through a bracket 190 secured to the back of the pneumatic manifold 166, and secured in place by a nut 192. The tip of the optical sensor 188 is inserted into an aperture 194 formed through the guide surface 176 of the guide plate 174. The optical sensor 188 senses by reflectivity whether there is material strip 24 present between the guide surfaces 176 and 182.

The guide assembly 146 also includes a tension switch for sensing tension in the material strip 24 during wrapping of the conductor 16. A switch arm 196 has an elongate portion 198 and a dog leg portion 200. A vertical slot 202 is formed through the front of the guide plate 174, and receives the switch arm 196. The switch arm 196 is pivotally secured to the guide plate 174 with a pin 204 so that it pivots about an axis defined by the juncture of the dog leg portion 200 and the elongate portion 198. The pin 204 passes through beating sleeves 205 placed in apertures formed transversely through the forward end of the guide plate 174 to enable smooth pivoting of the switch arm 196. The switch arm 196 is nominally disposed to a vertical position by its own weight. When so disposed, the top surface of the dog leg portion 200 project slightly above the guide surface 176 of the guide plate 174. When pressure is exerted on the switch arm 196 due to tension introduced in the material strip 24, the dog leg portion 200 is depressed so that it is even with the guide surface 176 as the switch arm 196 pivots on the pin 204. Referring to FIG. 10, a slot 206 is formed through the front of the pneumatic manifold 166, so that the pneumatic manifold 166 does not interfere with placement and pivoting of the switch arm 196.

A limit arm 208 is anti-rotatably secured on the pin 204 by a pin 210 so that it pivots in unison with the switch arm 196. The limit arm 208 is positioned against one of the side plates 178 of the guide assembly 146. The pivoting of the limit arm 208, and thus the switch arm 196, is limited by a stop screw 2 12 that is adjustably threaded into the top edge of a mounting plate 214. The mounting plate 214 is secured to the side of one of the mounting flanges 164 of the base block 158 below the limit arm 208. The mounting plate 214 is secured by two screws 216 that pass through a diagonally oriented, elongate slot 218 formed in the mounting plate 214. By loosening the screws 216, the mounting plate 214 can be adjusted in position to move the point at which the head of the stop screw 212 contacts the underside of the limit arm 208. The elevation of the head of the stop screw 212 can be further adjusted by threadably advancing it within the mounting plate 214. Thus, referring to FIG. 11, the stop screw 212 and mounting plate 214 can be adjustably positioned to determine the nominal rest position of the limit arm 208 and switch arm 196 when there is no tension on the material strip 24.

Referring to FIGS. 10 and 13, a proximity switch 220 is mounted through an oblong aperture 221 formed in one of the mounting flanges 164 of the base block 158, on the opposite side of the base block 158 from the mounting plate 214. The proximity switch 220 is secured by a nut 222. When the switch arm 196 is caused to pivot by application of force to the top of the dog leg portion 200, the bottom end of the elongate portion 198 of the switch arm 196 passes in front of the proximity switch 220, which then generates a signal indicating the sensing of tension in the material strip 24. The proximity switch 220 is adjustably positioned by sliding within the elongate aperture 221. This enables the proximity switch 220 to be selectively positioned so that the tension signal is generated at a selected degree of angular orientation of the switch arm 196.

Referring to FIGS. 10 and 11, the weld anvil assembly 150 shall now be described. The weld anvil assembly 150 includes a carrier member 224 that is secured to the top of the pistons of the pneumatic cylinder 153. The pneumatic cylinder 153 is operated automatically to raise and lower the carrier member 224 between an upper position, as shown in FIG. 11 in which the carrier member 224 contacts the bottom of the fingers 186 of the stop plate 148, and a lowered position. A semi-cylindrical recess 226 is formed in the front face of the carrier member 224, and defines an upwardly opening semi-cylindrical guide edge 228. A semi-cylindrical anvil plate 230 is mounted within the recess 226. The lower side of the anvil plate 230 defines a semi-cylindrical bearing edge 232 that bears on the guide edge 228 of the recess 226 of the carrier member 224. The anvil plate 230 is capable of pivoting about an axis defined by the curvature of the guide edge 228 and bearing edge 232. Thus, the anvil plate 230 slides against the carrier member 224. This pivoting motion of the anvil plate 230 relative to the carrier member 224 changes the orientation of a weld edge 234, defined by the top surface of the anvil plate 230, relative to horizontal. The welding pattern 56 and cutting blade 52 are secured to the weld edge 234 of the anvil plate 230 and spaced in parallel disposition, in the same manner as previously described for the applicator 10. Thus, the welding pattern 56 and cutting blade 52 are nominally oriented horizontally.

Pivoting of the anvil plate 230 is controlled by two tangentially oriented oblong slots 236 formed through the anvil plate 230. Screws 238 are inserted through the slots 236 and threaded into apertures 240 formed in the front of the carrier member 224 within the recess 226. The screws 238 are not tightened, such that the anvil plate 230 is free to pivot on the carrier member 224. If it is desired to lock the anvil plate 230 from pivoting after initial adjustment, lock screws 242 can be threaded into the anvil plate 230 until they bear against the carrier member 224.

The pivotal mounting of the anvil plate 230 enables the anvil plate 230 to self-adjust so that the welding pattern 56 and cutting blade 52 mounted on the weld edge 234 of the anvil plate 230 are oriented parallel to the weld edge 154 of the welding horn 32. Thus when the welding horn 32 is lowered and the weld anvil assembly 150 is raised so to compress the wrapped material strip 24 therebetween for welding, the anvil plate 230 automatically pivots to this parallel disposition. This automatic pivotal adjustment can be done once upon initial use of the equipment, followed by tightening of the lock screws 242, or the lock screws 242 can be maintained loose to allow this adjustment to occur each use of the applicator 120.

The weld anvil assembly 150 also includes two features to enable the weld anvil assembly to grip the leading end portion 22 of the material strip 24 during and after the welding operation. The weld anvil assembly 150 is connected to a vacuum line 244 for a first method of gripping, and also includes a grip assembly 246 for a second gripping method. Referring to FIGS. 10 and 11, utilization of the vacuum line 244 shall first be described. The vacuum line 244 is connected to an inlet port 248 formed in one side of the carrier member 224. The inlet port 248 is connected by internal passages to three outlet ports 250 formed through the upper surface of the carrier member 224, behind the anvil plate 230. Each outlet port 250 is configured as a cylindrical recess in which is received a tubular elastomeric sleeving section 252.

Each sleeving section 252 is slightly longer than the depth of the corresponding outlet port 250, so that each projects above the upper surface of the carrier member 224. The projecting upper ends of these sleeving sections 252 provides both a compression cushion and a vacuum port for gripping the leading end portion 22 of the material strip 24. When the weld anvil assembly 150 is fully raised to the uppermost position, as shown in FIG. 11, the leading end portion 22 of the material strip 24 is compressed between the upper ends of the sleeving sections 252 and the underside of the cap 180 of the guide assembly 146. In addition to this mechanical grip, which is effective only when the weld anvil assembly 150 is in the fully raised position for welding, a vacuum is drawn through the vacuum line 244, and thus through the outlet ports 250, to further draw the leading end portion 22 of the material strip 24 against the weld anvil assembly 150, whether in the raised or lowered position, as shall be described subsequently.

The grip assembly 246 shall now be described, and is best shown in FIGS. 10 and 11. The grip assembly 246 includes an elongate finger 254 having a narrow gripping end 256 and a lever end 258. A vertical slot 260 is formed through the upper corner of the carrier member 224, on the side of the carrier member 224 opposite the vacuum line 244. A center portion of the finger 254 is received within the slot 260 and pivotally secured in place by a pin 262. The finger 254 is pivotal between a gripping position, in which the underside of the gripping end 256 of the finger 254 contacts the upper surface of the carrier member 224, and a release position, in which the gripping end 256 of the finger 254 projects angularly upwardly above the upper surface of the carrier member 224.

Pivoting of the finger 254 is powered by operation of an air cylinder 264 having a cylinder end pivotally connected to the lever end 258 of the finger 254 by a pin 266, and a piston end pivotally connected to a boss 268 projecting from the bottom of the side of the carrier member 224 by a pin 270. The air cylinder 264 is automatically controlled by the controller 88 for selective pivoting of the finger 254 between the gripping and release positions.

The function and interrelationship of the foregoing described structure, as well as structure associated with delivering excess segments of material strip 24 to the waste drawer 138 of the applicator 120, will be better understood in view of the following description of the operation of the applicator 120.

OPERATION OF THE SECOND PREFERRED EMBODIMENT

Referring first to FIG. 12, the conductor 16 or other elongate object to be identified is fully inserted into the slot 126 formed in the side plates 128 of the housing 122, until it contacts the fingers 186 of the stop plate 148, to commence operation of the applicator 120. The controller 88 then starts the print, wrap, weld and cut sequence, which is fully automated. The printer 18 drives the friction rollers 20 (FIG. 13) to advance the leading end portion 22 of the material strip 24 through the guide passageway defined by the guide plate 174 and cap 180 of the guide assembly 146. Identification indicia is marked on the material strip 24 by the print head 42 of the primer 18.

Referring to FIG. 13, during this feeding operation, the ultrasonic welding horn 32 is withdrawn to the fully raised position, and the weld anvil assembly 150 is withdrawn to the fully lowered position, leaving clear access to feed the material strip 24 around the conductor 16. The printer 18 continues to advance until a predetermined length of material strip 24 has been fed. During the advancing of the material strip 24, the guide member 151 is positioned adjacent the receiving region defined by the terminus of the slots 126 and the side plates 128 and the stop plate 148. The guide member 151 surrounds the conductor 16 in this configuration.

As the leading end portion 22 and material strip 24 exits the guide assembly 146, it passes over the upper dog leg portion 200 of the switch arm 196. Because there is no tension in the material strip 24, the switch arm 196 remains in its relaxed vertical disposition, so that the elongate portion 198 of the switch arm 196 is forwardly of, and thus does not cover, the proximity switch 220.

As the leading end portion 22 of the material strip 24 is further advanced, it enters the channel 156 in the guide member 151, and is guided to wrap loosely around the conductor 16. The leading end portion 22 of the material strip 24 then exits the channel 156, passes over the lowered weld anvil assembly 150, and stops movement when it contacts the guide assembly 146, as is shown in FIG. 13. The leading end portion 22 is now oriented substantially parallel to the portion of the material strip exiting the guide assembly 146. As shown in FIG. 13, in the preferred embodiment illustrated, the material strip 24 is caused to curve downwardly by the guide member 151. However, it will be apparent to one of ordinary skill in the art that the applicator 120 could just as suitably be configured so that the material strip 24 curves upwardly. Either configuration is referred to herein as resulting in the leading end portion 22 "overlapping" the material strip 24.

If for some reason during this operation the material strip 24 is not present within the guide assembly 146, such as if the supply of material strip 24 runs out, the optical sensor 188 senses this absence and signals the operator to reload or otherwise correct the supply of the material strip 24.

During the advancing of the material strip 24, the finger 252 carried on the weld anvil assembly 150 is positioned with the gripping end 256 of the finger projecting upwardly, so that it does not contact against the upper surface of the carrier member 224, as shown in FIG. 13. The finger 254 is then pivoted by the pneumatic cylinder 264 from the upper release position to the lower gripping position, so that it compresses the leading end portion 22 of material strip 24 between the gripping end 256 of the finger 254 and the upper surface of the carrier member 224. Additionally, at this point a vacuum is drawn through the vacuum line 244 to draw the leading end portion 22 of the material strip 24 against the sleeving sections 252 carried by the weld anvil assembly 150.

Figure 14:
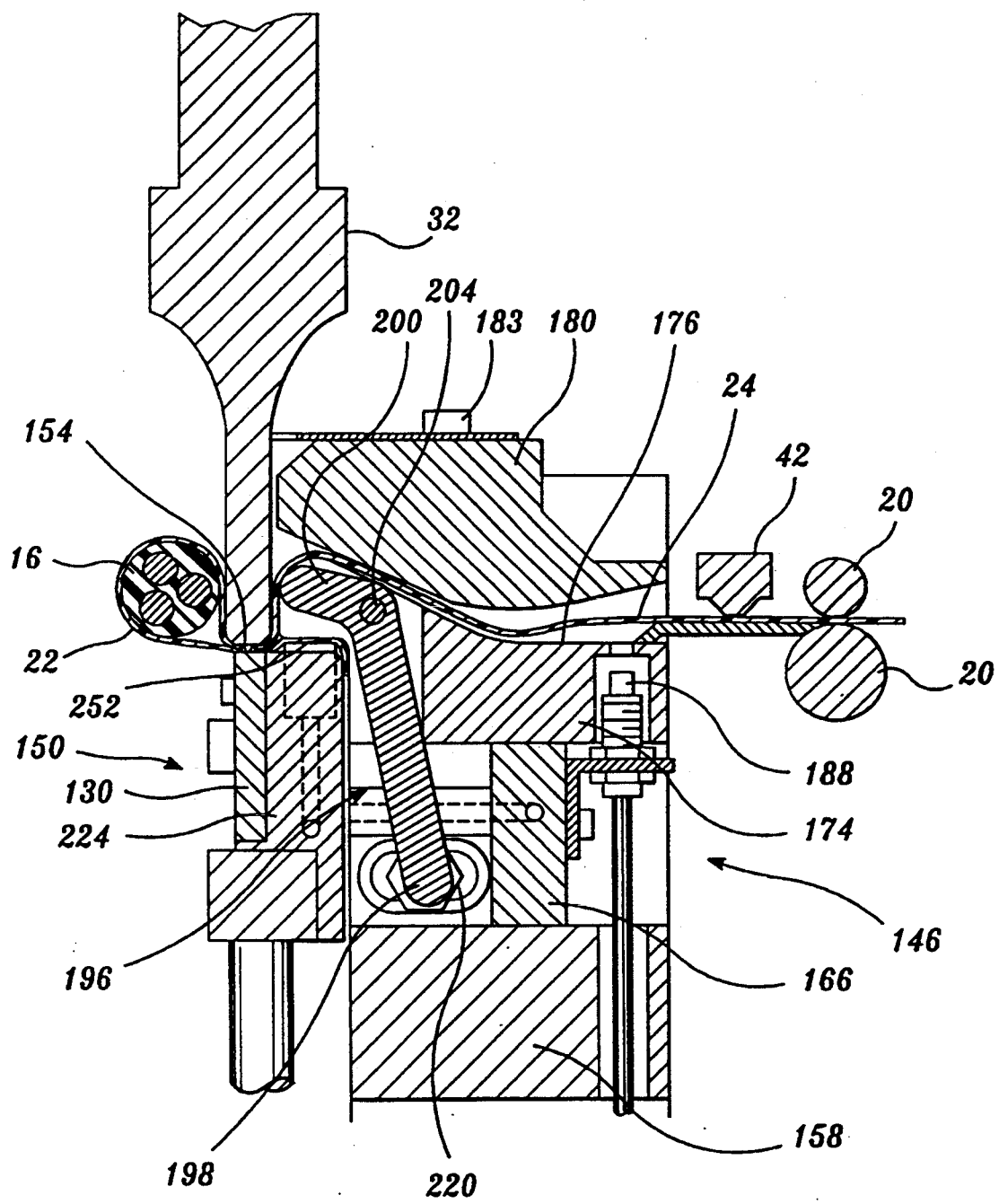
FIG. 14 is a side elevation schematic view, taken along a vertical cross section, of the applicator of FIG. 9 positioned after tightening and during welding of the wrapped material strip.

In addition to these methods of gripping the material strip 24, the weld anvil assembly 150 is then moved to a fully raised position, as shown in FIG. 14. In this position, the leading end portion 22 is compressed between the weld anvil assembly 150, cushioned by the sleeving sections 252, and the underside of the cap 180 of the guide assembly 146. During the remainder of the wrapping and welding operation, the leading end portion 22 of the material strip 24 is gripped by all three of these redundant methods.

The welding horn 32 is then lowered to a gap position (not shown), wherein the weld edge 154 of the welding horn 32 is positioned just above the anvil plate 230, with the leading end portion 22 and material strip 24 loosely captured therebetween. The printer 18 is then operated to drive the friction rollers 20 in the reverse direction, to retract and tighten the material strip 24. As the material strip 24 is withdrawn, the excess slack in the material strip 24 is taken up and the material strip 24 is wrapped securely around the conductor 16. This wrapping biases the conductor 16 against the fingers 186 of the stop plate 148.

Reverse line feeding of printer 18 continues until sufficient tension is placed on the dog leg portion 200 of the switch arm 196 to cause the switch arm to pivot, as shown in FIG. 14, whereupon the elongate portion 198 of the switch arm 196 covers the proximity switch 220. In response to the proximity switch 220 being activated, indicating there is sufficient tension in the material strip 24, the controller 88 controls the printer 18 to terminate reverse line feeding. Alternately, instead of acting in response to the proximity switch 220, the controller can be preprogrammed to simply operate the printer in the reverse mode for a predetermined period of time or number of line increments. This predetermined period of time is set for slightly longer than the time required to wrap the material strip 24 tightly around the conductor 16, after which the friction rollers 20 simply slip on the material strip 24. Retraction of too much of the material strip 24 in the direction of the roll 130 is prevented by the tight gripping of the leading end portion 22 of the material strip 24 on the welding anvil assembly 150.

Referring to FIG. 14, once the material strip 24 has been tensioned sufficiently, the weld horn 32 is lowered further to its lowermost position, in which the leading end portion 22 and overlapping material strip 24 are compressed between the weld edge 154 of the welding horn 32 and the weld edge 234 of the anvil plate 230, which carries the welding pattern 56 and cutting blade 52. Ultrasonic energy is then applied to the welding horn 32, causing the material strip 24 to be welded to form the tubular welded sleeve 34. At the same time, as described previously, the tubular welded sleeve 34 and the excess of the leading end portion 22 gripped by the weld anvil assembly 150 are severed free from each other and from the material strip 24 by the cutting blade 52.

Figure 15:
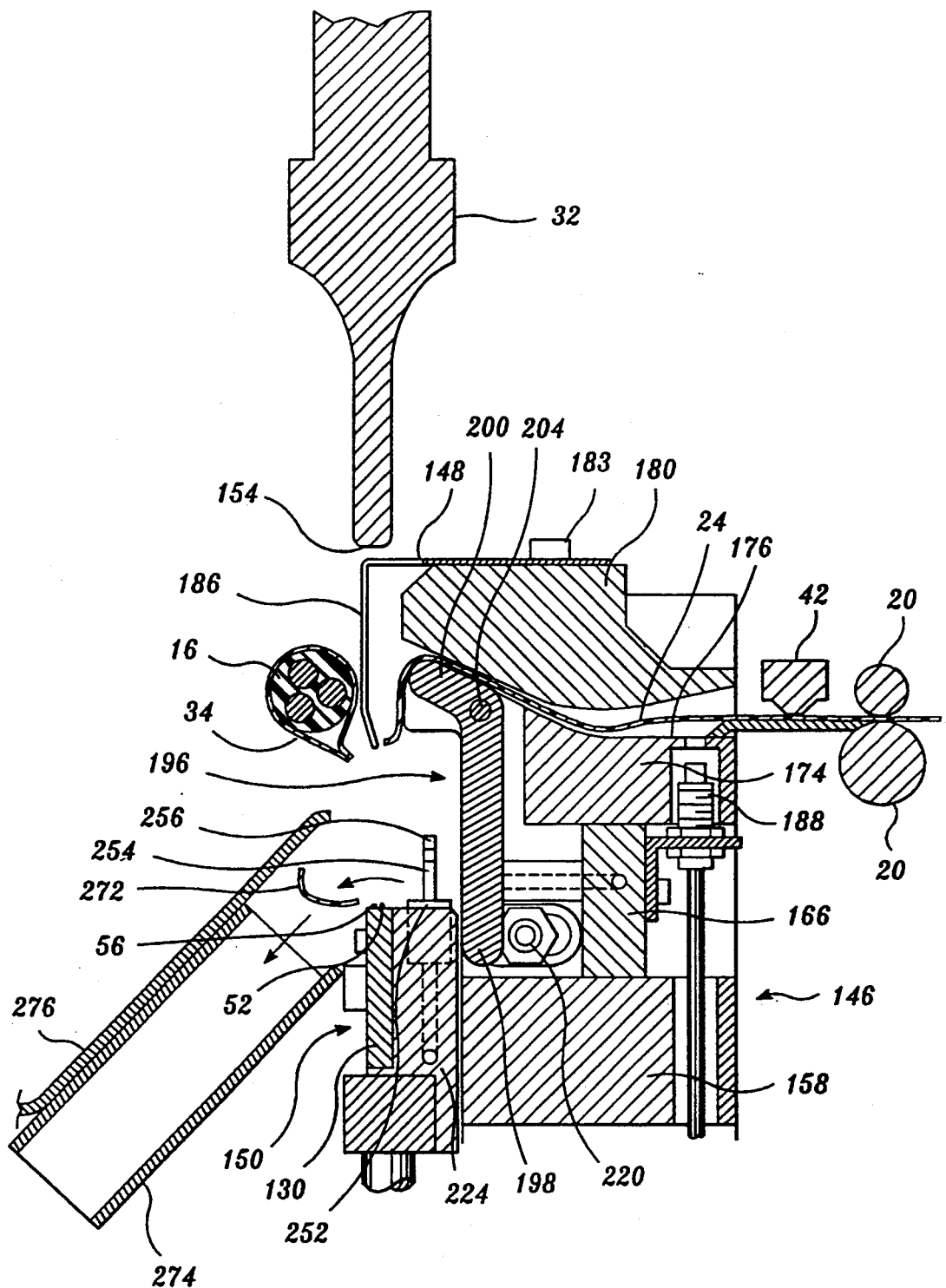
FIG. 15 is a side elevation schematic view, taken along a vertical cross section, of the applicator of FIG. 9 positioned after welding and cutting of the wrapped material strip, with the material strip remnant being discharged into the remnant discharge shoot.

Referring to FIG. 15, the welding horn 32 then retracts upwardly to its upper position and the weld anvil assembly 150 is lowered to its lowered position. During lowering of the weld anvil assembly 150, the severed excess segment 272 of the material strip 24, which was the leading end portion 22 of the material strip 24 prior to welding, is still gripped by the finger 254 and the application of vacuum through the carrier member 224. Also, if the excess segment 272 of the material strip 24 is not completely severed from the tubular welded sleeve 34, as may happen in some circumstances, the tight gripping of the excess segment 272 enables it to be torn free of the tubular welded sleeve 34 the remainder of the way. The excess segment 272 of material strip 24 is thus conveyed downwardly with the weld anvil assembly 150 as the weld anvil assembly 150 is lowered.

Referring to FIG. 15, once in the lowered position, the finger 254 is pivoted to the release position, and the vacuum is released from the carrier member 224. At the same time, a blast of compressed air or other gas is released through the pneumatic manifold 166 to propel the excess segment 272 from the top of the weld anvil assembly 150, into a chute 274. The chute 274 is mounted by a bracket 276 to the pneumatic cylinder 152 that powers the guide member 151, as shown in FIG. 12. The excess segments 272 are discharged from the lower end of the chute 274 into the waste drawer 138 for collection and periodic emptying.

The preferred embodiments of the applicators 10 and 120 including the printer 18 have been found to reliably advance the material strip 24 to ensure that the point of the material strip on which the indicia 36 are marked is positioned around the conductor 16. However, if necessary, a tracking mechanism could be incorporated into the applicators to ensure that there is no misalignment over time. The material strip 24 would be preprinted with a series of evenly spaced visual markings, such as black dots. An optical detector could be mounted within the base 12 to sense the passage of the printed black dots as the material strip is advanced through the applicator 10. The optical detector would provide feedback to the controller 88 to ensure that the proper length of material strip 24 is advanced for accurate positioning of the indicia 36.

The applicators 10 and 120 described above enable substantially simultaneous welding and severing of the welded sleeve 34. However, if desired, a separate severing step could be performed after completion of the welding. Thus, after welding, the welding horn 32 would be withdrawn and a cutting blade would move downwardly to sever the welded sleeve 34 from the strip.

One of ordinary skill, after reading the foregoing specification, may be able to effect various other changes, alterations and substitutions of equivalents without departing from the broad concepts disclosed herein. It is therefore intended that the scope of Letters Patent granted hereon be limited only by the definitions contained in the appended claims and the equivalents thereof.

The embodiments of the invention in which an exclusive property or privilege is claimed are defined as follows:

1. An apparatus for forming a welded identification sleeve around an elongate object from a continuous strip of weldable material, comprising:

a base defining a receiving surface for receiving an elongate object to be identified;

a reversible material strip feeder positioned adjacent the receiving surface of the base capable of selective operation in an advance mode to advance the lead portion of a flexible weldable material strip toward a first end of the base and transversely past the elongate object, and a reverse mode in which the material strip is retracted away from the first end of the base;

guide means mounted on the base and positionable adjacent the receiving surface of the base for guiding the lead portion of the material strip, when advanced by the material strip feeder, around the elongate object whereby the lead portion of the material strip overlaps the material strip so that the material strip is wrapped around the elongate object;

gripper means mounted on the base for gripping the wrapped lead portion of the material strip during operation of the material strip feeder in the reverse mode to tighten the wrapped material strip around the elongate object;

a welder mounted on the base for welding the wrapped lead portion of the material strip to the material strip, thereby forming a tubular sleeve around the elongate object, the welder comprising an energy imparting weld member and an anvil assembly disposed on opposite sides of the overlapped materials strip, the anvil assembly including a carrier member and an anvil plate pivotally connected to the carrier member to pivot in a plane oriented transversely to a longitudinal axis defined by the material strip, the anvil plate pivoting relative to the carrier member to align the anvil plate with the energy imparting weld member during welding; and a cutter mounted on the base for cutting the tubular sleeve from the material strip.

2. The apparatus of claim 1, further comprising:

tension sensing means for sensing tension in the wrapped material strip during operation of the material strip feeder in the reverse mode, wherein operation of the material strip feeder is automatically controlled in response to the tension sensing means.

3. The apparatus of claim 1, wherein tightening of the wrapped material strip about the elongate object during operation of the material strip feeder in the reverse mode results in biasing of the elongate object against the receiving surface of the base.

4. The apparatus of claim 1, wherein the guide means is constructed such that the lead portion of the material strip overlaps the material strip in opposing parallel disposition.

5. The apparatus of claim 1, wherein the reversible material strip feeder further comprises:

means for holding a roll of the material strip; and a pivot arm pivotally mounted on one of the base and the reversible material strip feeder and biased against the perimeter of the roll to prevent unraveling of the roll, the pivot arm defining a guide surface in which the material strip is engaged as it is removed from the roll.

6. An apparatus for forming a welded identification sleeve around an elongate object from a continuous strip of weldable material, comprising:

a base defining a receiving surface for receiving an elongate object to be identified;

a material strip feeder positioned adjacent the receiving surface of the base for advancing the lead portion of a flexible weldable material strip transversely past the elongate object;

guide means mounted on the base and positionable adjacent the receiving surface of the base for guiding the lead portion of the material strip around the elongate object, whereby the lead portion of the material strip overlaps the material strip so that the material strip is wrapped around the elongate object;

gripper means mounted on the base for gripping the lead end of the material strip to retain the material strip wrapped about the elongate object;

tension sensing means for sensing tension in the wrapped material strip;

tensioning means for tensioning the wrapped material strip to tighten the wrapped material strip around the elongate object;

control means for automatically controlling operation of the tensioning means in response to the tension sensing means;

a welder mounted on the base for welding the lead portion of the material strip to the material strip, thereby forming a tubular sleeve around the elongate object, the welder comprising an energy imparting weld member and an anvil assembly disposed on opposite sides of the overlapped materials strip, the anvil assembly including a carrier member and an anvil plate pivotally connected to the carrier member to pivot in a plane oriented transversely to a longitudinal axis defined by the material strip, the anvil plate pivoting relative to the carrier member to align the anvil plate with the energy imparting weld member during welding; and a cutter mounted on the base for cutting the tubular sleeve from the material strip.

7. The apparatus of claim 6, wherein tightening of the wrapped material strip about the elongate object during operation of the tensioning means results in biasing of the elongate object against the receiving surface of the base.

8. The apparatus of claim 6, wherein the guide means is constructed such that the lead portion of the material strip overlaps the material strip in opposing parallel disposition.

9. An apparatus for forming a welded identification sleeve around an elongate object from a continuous strip of weldable material, comprising:

a base defining a receiving surface for receiving an elongate object to be identified;

a material strip feeder positioned adjacent the receiving surface of the base for advancing the lead portion of a weldable material strip to pass transversely alongside the elongate object;

guide means mounted on the base and positionable adjacent the receiving surface of the base for guiding the lead portion of the material strip around the elongate object, whereby the lead portion of the material strip overlaps the material strip so that the material strip is wrapped around the elongate object;

an energy imparting weld member disposed in proximity to the receiving surface of the base and positionable so that a weld edge of the weld member contacts a first side of the overlapped material strip and lead portion of the material strip;

a weld anvil assembly disposed in proximity to the receiving surface of the base and positionable to contact a second side of the overlapped material strip and lead portion of the material strip, whereby the material strip is weldable between the weld member and the weld anvil assembly to form a tubular sleeve around the elongate object, wherein the weld anvil assembly comprises:

a carrier member; and an anvil plate pivotably connected to the carder member to pivot in a plane oriented transversely to a longitudinal axis defined by the material strip, the anvil plate defining a weld edge that is positionable to contact the second side of the overlapped material strip and lead portion of the material strip during welding, the anvil plate pivoting relative to the carrier member to align the weld edge of the anvil plate with the weld edge of the weld member; and means for severing the tubular sleeve from the material strip.

10. The apparatus of claim 9, wherein the anvil plate is mounted to pivot during welding to a position wherein the weld edge of the anvil plate is parallel with the weld edge of the weld member.

11. An apparatus for forming a welded identification sleeve around an elongate object from a continuous strip of weldable material, comprising:

a base defining a receiving surface for receiving an elongate object to be identified;

a material strip feeder positioned adjacent the receiving surface of the base for advancing the lead portion of a weldable material strip to pass transversely alongside the elongate object;

guide means mounted on the base and positionable adjacent the receiving surface of the base for guiding the lead portion of the material strip around the elongate object, whereby the lead portion of the material strip overlaps the material strip so that the material strip is wrapped around the elongate object;

an energy imparting weld member disposed in proximity to the receiving surface of the base and positionable so that a weld edge of the weld member contacts a first side of the overlapped material strip and lead portion of the material strip:

a weld anvil assembly disposed in proximity to the receiving surface of the base and positionable to contact a second side of the overlapped material strip and lead portion of the material strip, whereby the material strip is weldable between the weld member and the weld anvil assembly to form a tubular sleeve around the elongate object, wherein the weld anvil assembly comprises:

a carrier member; and an anvil plate pivotably connected to the carrier member, the anvil plate defining a weld edge that is positionable to contact the second side of the overlapped material strip and lead portion of the material strip during welding, the anvil plate pivoting relative to the carrier member to align the weld edge of the anvil plate with the weld edge of the weld member, wherein the anvil plate defines an arcuate bearing edge and the carrier member defines an arcuate guide surface that is contoured correspondingly to the arcuate bearing edge of the anvil plate, the bearing edge of the anvil plate beating against the guide surface of the carrier member and sliding relative to the guide surface of the carrier member during pivoting of the anvil plate; and means for severing the tubular sleeve from the material strip.

12. The apparatus of claim 11, wherein the anvil plate defines at least one oblong aperture, further comprising a guide pin passing through the oblong aperture of the anvil plate and being secured to the carrier member.

13. A method for forming a welded identification sleeve around an elongate object from a continuous strip of weldable material, comprising:

positioning an elongate object on a receiving surface of a base;

advancing a lead portion of a flexible weldable material strip using a reversible material strip feeder operated in an advance mode toward a first end of the base and transversely past and wrapping around the elongate object, whereby the lead portion of the material strip overlays the material strip;

gripping the wrapped lead portion of the material strip;

operating the reversible material strip feeder in a reverse mode to retract the material strip away from the first end of the base to tighten the wrapped material strip around the elongate object;

welding the lead portion of the material strip to the material strip to form a tubular sleeve around the elongate object, wherein the welding comprises sandwiching the overlapped material strip between an energy imparting weld member and an anvil assembly, the anvil assembly including a carrier member and an anvil plate pivotally connected to the carrier member to pivot in a plane oriented transversely to a longitudinal axis defined by the material strip for alignment of the anvil plate with the energy imparting weld member during welding; and cutting the tubular sleeve from the material strip.

14. The method of claim 13, further comprising:

sensing the tension in the wrapped material strip during operation of the reversible material strip feeder in the reverse mode; and automatically controlling the operation of the reversible material strip feeder in response to the sensed tension.

15. The method of claim 13, wherein the step of operating the reversible material strip feeder in the reverse mode results in the material strip biasing the elongate object against the receiving surface of the base.

16. The method of claim 13, wherein the step of advancing the lead portion of the weldable material strip further comprises guiding the lead portion of the material strip around the elongate object so that the lead portion of the material strip overlaps the material strip in parallel opposing disposition.

17. A method for forming a welded identification sleeve around an elongate object from a continuous strip of weldable material, comprising:

advancing a lead portion of a weldable material strip transversely past and wrapping around an elongate object, whereby the lead portion of the material strip overlaps the material strip;

gripping the wrapped lead portion of the material strip;

applying tension to the wrapped material strip to tighten the wrapped material strip around the elongate object;

sensing the tension in the wrapped material strip during the application of tension to the wrapped material strip;

automatically controlling the application of tension to the wrapped material strip in response to the sensed tension;

welding the lead portion of the material strip to the material strip to form a tubular sleeve around the elongate object, wherein the welding comprises sandwiching the overlapped material strip between an energy imparting weld member and an anvil assembly, the anvil assembly including a carrier member and an anvil plate pivotally connected to the carrier member to pivot in a plane oriented transversely to a longitudinal axis defined by the material strip for alignment of the anvil plate with the energy imparting weld member during welding; and cutting the tubular sleeve from the material strip.

18. A method for forming a welded identification sleeve around an elongate object from a continuous strip of weldable material, comprising:

positioning an elongate object on a receiving surface of a base;

advancing a lead portion of a weldable material strip transversely past and wrapping around an elongate object, whereby the lead portion of the material strip overlaps the material strip;

gripping the wrapped lead portion of the material strip;

welding the lead portion of the material strip to the material strip to form a tubular sleeve around the elongate object, wherein the welding comprises sandwiching the overlapped material strip between an energy imparting weld member and an anvil assembly, the anvil assembly including a carrier member and an anvil plate pivotally connected to the carrier member to pivot in a plane oriented transversely to a longitudinal axis defined by the material strip for alignment of the anvil plate with the energy imparting weld member during welding;

severing the material strip and an excess length of the welded lead portion of the material strip from the tubular sleeve; and automatically conveying the severed excess length of the welded lead portion of the material strip from proximate the receiving surface of the base to a waste depository.

19. The method of claim 18, wherein:

the step of welding the lead portion of the material strip to the material strip comprises positioning an energy imparting weld member adjacent a first side of the overlapped material strip and lead portion of the material strip, and positioning a weld anvil adjacent a second side of the overlapped material strip and lead portion of the material strip; and the step of gripping the wrapped lead portion of the material strip comprises securing the lead portion of the material strip against the weld anvil.

20. The method of claim 19, wherein the lead portion of the material strip is secured against the weld anvil by compressing the lead portion between the weld anvil and a gripper finger that is pivotally secured to the weld anvil and is pivotable between a gripping position and a release position.

21. The method of claim 20, wherein the lead portion of the material strip is further secured by drawing a vacuum through the weld anvil to pull the lead portion of the material strip against the weld anvil.

22. The method of claim 19, wherein the lead portion of the material strip is secured against the weld anvil by drawing a vacuum through the weld anvil to pull the lead portion of the material strip against the weld anvil.

23. The method of claim 18, further comprising the step of propelling the conveyed severed excess length of the welded lead portion of the material strip into the waste depository with a blast of a gas.

* * * * *

UNITED STATES PATENT AND TRADEMARK OFFICE
CERTIFICATE OF CORRECTION

PATENT NO. : 5,425,826      Page 1 of 3
DATED : June 20, 1995
INVENTOR(S) : B. Sayyadi et al.

It is certified that error appears in the above-indentified patent and that said Letters Patent is hereby corrected as shown below:

| COLUMN | LINE | |
|---|---|---|
| 1 | 2 | Before "METHOD" insert --IMPROVED-- |
| 1 | 6 | After "prior" insert --copending-- |
| 2 | 7 | "beating" should read --bearing-- |
| 2 | 7 | "indicia beating" should read --indicia-bearing-- |
| 2 | 27 | "indicia bearing" should read --indicia-bearing-- |
| 2 | 43 & 44 | "beating" should read --bearing-- |
| 3 | 68 | After "form" insert --a-- |
| 4 | 27 | "of f ceding" should read --feeding-- |
| 5 | 23 | "welding" should read --welded-- |
| 6 | 7 | "foraged" should read --formed-- |
| 8 | 32 | "keypad-" should read --keypad.-- |

UNITED STATES PATENT AND TRADEMARK OFFICE
CERTIFICATE OF CORRECTION

PATENT NO. : 5,425,826   Page 2 of 3
DATED : June 20, 1995
INVENTOR(S) : B. Sayyadi et al.

It is certified that error appears in the above-indentified patent and that said Letters Patent is hereby corrected as shown below:

| COLUMN | LINE | |
|---|---|---|
| 12 | 68 | "beating" should read --bearing-- |
| 13 | 6 | "project" should read --projects-- |
| 13 | 21 | "screw 2 12" should read --screw 212-- |
| 14 | 59 | "provides" should read --provide-- |
| 15 | 51 | "primer" should read --printer-- |
| 20 (Claim 9, | 42 line 30) | Should be further indented five spaces. |
| 20 (Claim 9, | 42 line 31) | Should be further indented five spaces. |
| 20 (Claim 9, | 42 line 31) | "carder" should read --carrier-- |
| 21 (Claim 11, | 9 line 21) | "material strip:" should read --material strip;-- |
| 21 (Claim 11, | 18 line 30) | Should be further indented five spaces. |

UNITED STATES PATENT AND TRADEMARK OFFICE
CERTIFICATE OF CORRECTION

PATENT NO. : 5,425,826
DATED : June 20, 1995
INVENTOR(S) : B. Sayyadi et al.

It is certified that error appears in the above-indentified patent and that said Letters Patent is hereby corrected as shown below:

| COLUMN | LINE | |
|---|---|---|
| 21 (Claim 11, | 19 line 31) | Should be further indented five spaces. |
| 21 (Claim 11, | 31 line 43) | "beating" should read --bearing-- |

Signed and Sealed this

Twenty-sixth Day of December, 1995

Attest:

BRUCE LEHMAN

*Attesting Officer*       *Commissioner of Patents and Trademarks*